US008431004B2

(12) United States Patent
Taguchi et al.

(10) Patent No.: US 8,431,004 B2
(45) Date of Patent: *Apr. 30, 2013

(54) ANTIREFLECTIVE MEMBER, OPTICAL ELEMENT, DISPLAY DEVICE, METHOD OF MAKING STAMPER AND METHOD OF MAKING ANTIREFLECTIVE MEMBER USING THE STAMPER

(75) Inventors: Tokio Taguchi, Tenri (JP); Shun Ueki, Nara (JP); Kozo Nakamura, Kashiba (JP); Kazuhiko Tsuda, Ikoma-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 935 days.

This patent is subject to a terminal disclaimer.

(21) Appl. No.: 12/382,896

(22) Filed: Mar. 26, 2009

(65) Prior Publication Data
US 2009/0211912 A1    Aug. 27, 2009

Related U.S. Application Data

(60) Division of application No. 11/702,583, filed on Feb. 6, 2007, now Pat. No. 7,835,080, which is a continuation of application No. PCT/JP2005/022097, filed on Dec. 1, 2005.

(30) Foreign Application Priority Data

Dec. 3, 2004  (JP) ................................. 2004-350863
Sep. 29, 2005  (JP) ................................. 2005-285188

(51) Int. Cl.
*C25D 11/24* (2006.01)
*C25D 11/12* (2006.01)
(52) U.S. Cl.
USPC ............. 205/213; 205/70; 205/175; 205/205; 205/210; 205/324

(58) Field of Classification Search .................. 205/205, 205/210, 219, 213; 264/2.5
See application file for complete search history.

(56) References Cited

U.S. PATENT DOCUMENTS

| 4,500,392 A | * | 2/1985 | Slaten ............................. 205/68 |
| 6,066,392 A | | 5/2000 | Hisamoto et al. |

(Continued)

FOREIGN PATENT DOCUMENTS

| CN | 1534314 A | | 10/2004 |
| JP | 03036021 A | * | 2/1991 |
| JP | 2001-162600 A | | 6/2001 |
| JP | 2001-183506 A | | 7/2001 |

(Continued)

OTHER PUBLICATIONS

U.S. Office Action mailed May 4, 2009 in U.S. Appl. No. 11/702,583.

(Continued)

*Primary Examiner* — Harry D Wilkins, III
*Assistant Examiner* — Bryan D. Ripa
(74) *Attorney, Agent, or Firm* — Nixon & Vanderhye P.C.

(57) ABSTRACT

A method for making a stamper which has an uneven surface pattern, in which unit structures are arranged in x and y directions at respective periods that are both shorter than the shortest wavelength of an incoming light ray, on the surface of a substrate and satisfies the following Inequality (1):

$$\frac{\Lambda x, y}{\lambda_{min}} < \frac{1}{ni + ni \cdot \sin\theta i_{max}} \quad (1)$$

where $\lambda_{min}$ is the shortest wavelength of the incoming light ray, $\theta i_{max}$ is the largest angle of incidence of the incoming light ray, ni is the refractive index of an incidence medium, $\Lambda x$ is the period of the uneven surface pattern in the x direction, and $\Lambda y$ is the period of the pattern in the y direction. As a result, diffraction of short-wave light components can be reduced in a broad wavelength range.

14 Claims, 20 Drawing Sheets

U.S. PATENT DOCUMENTS

| | | | |
|---|---|---|---|
| 6,914,008 B2 | 7/2005 | Den et al. | |
| 6,972,146 B2 | 12/2005 | Den et al. | |
| 6,982,217 B2 | 1/2006 | Imada et al. | |
| 7,066,234 B2 | 6/2006 | Sawitowski | |
| 7,214,418 B2 | 5/2007 | Den et al. | |
| 7,252,869 B2 | 8/2007 | Khusnatdinov et al. | |
| 7,319,069 B2 | 1/2008 | Den et al. | |
| 7,322,871 B2 | 1/2008 | Lambertini et al. | |
| 7,455,759 B2 | 11/2008 | Saito et al. | |
| 2002/0044356 A1 | 4/2002 | Arakawa et al. | |
| 2002/0109134 A1 | 8/2002 | Ivasaki et al. | |
| 2004/0163441 A1 | 8/2004 | Sawitowski | |
| 2004/0188874 A1 | 9/2004 | Hikita et al. | |
| 2006/0194433 A1 | 8/2006 | Saito et al. | |
| 2007/0235342 A1 | 10/2007 | Matsuo et al. | |
| 2010/0283165 A1* | 11/2010 | Ihara | 264/2.5 |
| 2011/0012272 A1* | 1/2011 | Ihara | 264/1.7 |

FOREIGN PATENT DOCUMENTS

| | | |
|---|---|---|
| JP | 2001-272505 | 10/2001 |
| JP | 2001-517319 | 10/2001 |
| JP | 2002-267815 A | 9/2002 |
| JP | 2002-283354 A | 10/2002 |
| JP | 2002-286906 | 10/2002 |
| JP | 2003-043203 | 2/2003 |
| JP | 2003-043203 A | 2/2003 |
| JP | 2003-240904 | 8/2003 |
| JP | 2003-294910 A | 10/2003 |
| JP | 2004-12856 A | 1/2004 |
| JP | 2004-205990 | 7/2004 |
| JP | 2004-217961 A | 8/2004 |
| JP | 2004-287238 | 10/2004 |
| JP | 2005-156695 A | 6/2005 |
| WO | 95/25825 | 9/1995 |

OTHER PUBLICATIONS

Grann et al, "Artificial Uniaxial and biaxial dielectrics with use of Two-Dimensional Subwavelength Binary Gratings", J. Opt. Soc. Am. A., vol. 11, No. 10, Oct. 1994, pp. 2695-2703.

U.S. Office Action mailed Nov. 2, 2010 in related U.S. Appl. No. 12/382,897.

Definition of "BULK" from Merriam-Webster website downloaded Oct. 22, 2010.

U.S. Office Action mailed Oct. 20, 2009 in U.S. Appl. No. 11/702,583.

U.S. Office Action mailed Jan. 29, 2010 in U.S. Appl. No. 11/702,583.

International Search Report for PCT/JP2005/022097 mailed Mar. 14, 2006 (English and Japanese).

Masuda et al., *Yokyoku Sanka Porous Alumina o Igata Tosuru Polymer Hansha Kozo no Keisei*, Dai 23 Kai Hyomen Kagaku Koen Taikai Yoshishu, Nov. 26, 2003, 3B35, p. 125.

Masuda et al., *Proceedings of the 52$^{nd}$ Meeting of Applied Physics Related Societies of Japan*, Spring 2005, 30p-ZR-9, p. 1112.

Moharam, *Coupled-Wave Analysis of Two-Dimensional Dielectric Gratings*, SPIE 883 (1988), pp. 8-11.

Lalanne et al., J. Modern Optics, vol. 43, No. 10, p. 2063, 1996.

English translation of the International Preliminary Report on Patentability mailed Jun. 14, 2007 in corresponding PCT application PCT/JP2005/022097.

U.S. Office Action mailed Jun. 8, 2010 in related U.S. Appl. No. 12/382,897.

Masuda et al., *Yokyoku Sanka Porous Alumina o Igata Tosuru Polymer Hansha Kozo no Keisei*, Dai 23 Kai Hyomen Kagaku Koen Taikai Yoshishu, Nov. 26, 2003, 3B35, p. 125, with English translation.

Masuda et al., *Proceedings of the 52$^{nd}$ Meeting of Applied Physics Related Societies of Japan*, Fabrication of Polymer Anti-Reflective Structure Using Anodic Porous Alumina as a Template, Spring 2005, 30p-ZR-9, p. 1112, with English translation.

Lalanne et al., J. Modern Optics, "On the Effective Medium Theory of Subwavelength Periodic Structures," vol. 43, No. 10, p. 2063-2085, 1996.

Xu et al., "Bone-Shaped Nanomaterials for Nanocomposite Applications," Nano Letters, vol. 3, No. 8, 2003, pp. 1135-1139.

\* cited by examiner

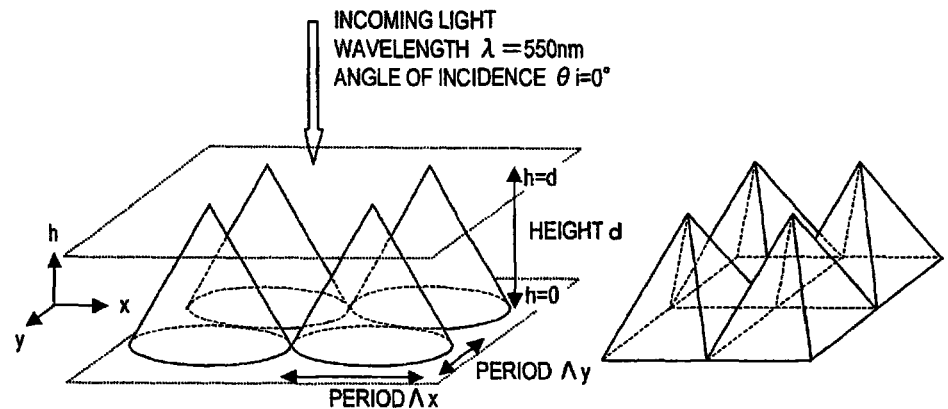
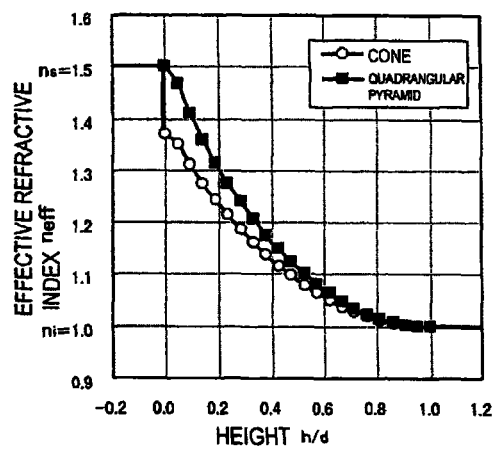
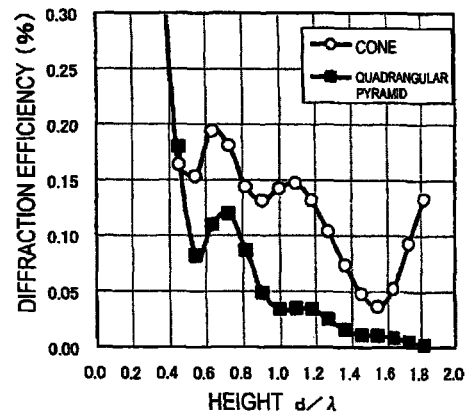
FIG.5(a)   FIG.5(b)
FIG.5(c)   FIG.5(d)

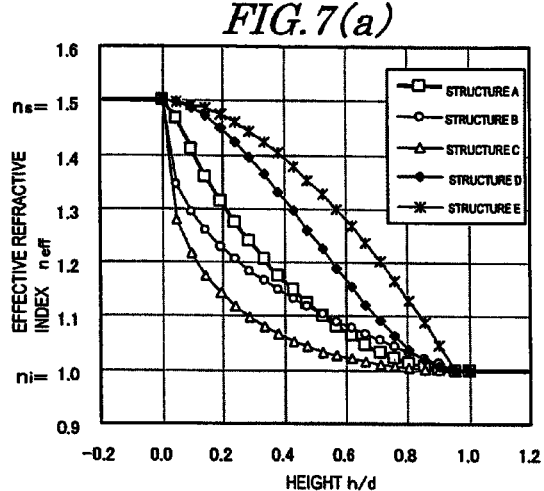
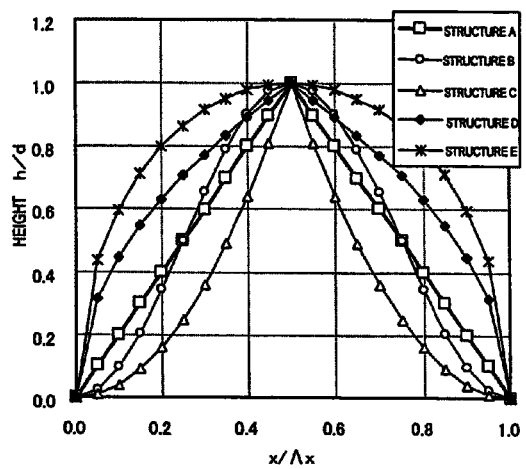
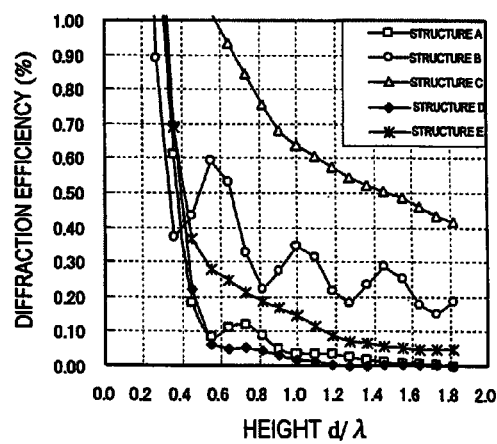

ANODIZATION A1    ETCHING A2

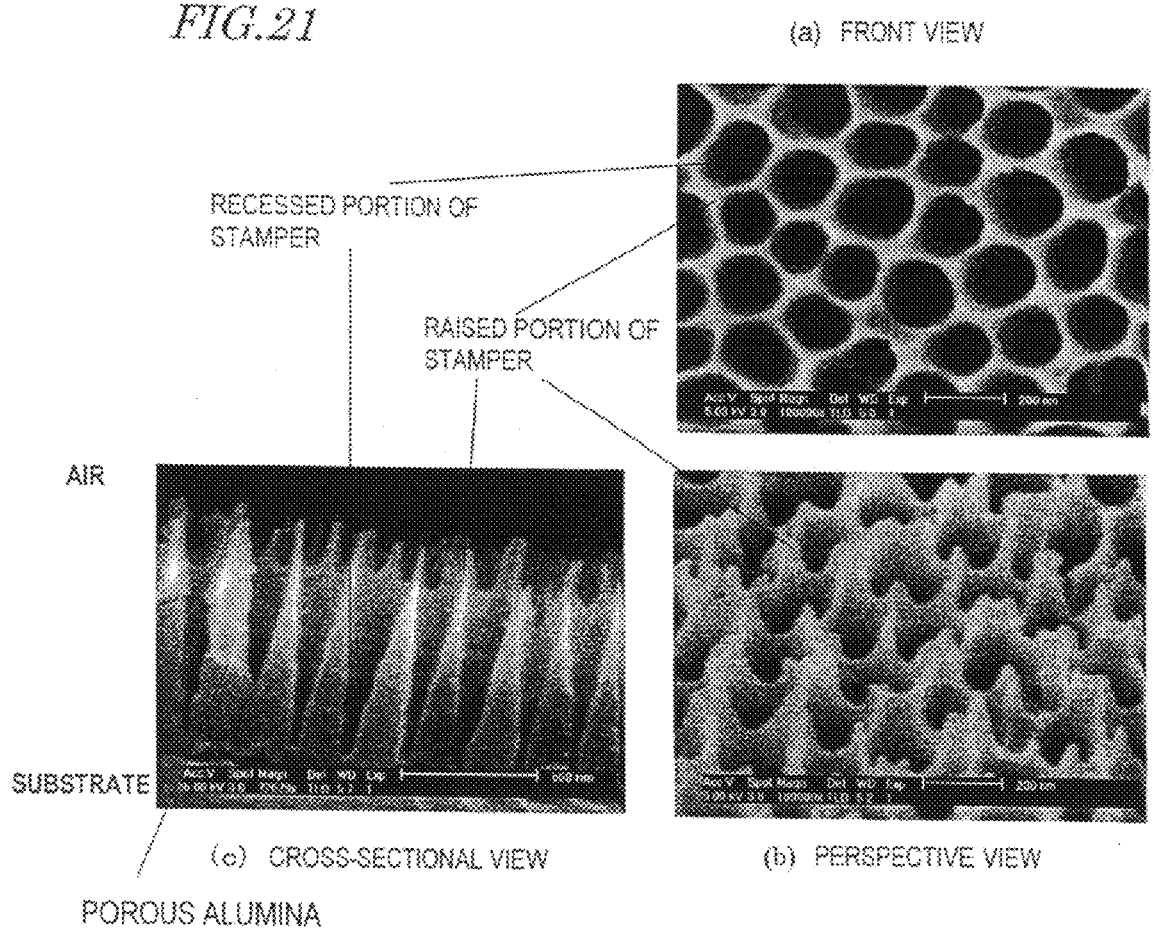

SMOOTH    10step    5step

ANTIREFLECTIVE MEMBER, OPTICAL ELEMENT, DISPLAY DEVICE, METHOD OF MAKING STAMPER AND METHOD OF MAKING ANTIREFLECTIVE MEMBER USING THE STAMPER

This is a divisional of U.S. patent application Ser. No. 11/702,583, filed Feb. 6, 2007 now U.S. Pat. No. 7,835,080, which is a continuation of International Application PCT/JP2005/022097, with an international filing date of Dec. 1, 2005, which claims priorities on Japanese Patent Application No. 2004-350863 filed on Dec. 3, 2004, and Japanese Patent Application No. 2005-285188 filed on Sep. 29, 2005. The entire contents of these Japanese Patent Applications and U.S. Patent Application are hereby incorporated by reference.

BACKGROUND OF THE INVENTION

1. Field of the Technology

The technology presented herein relates to an antireflective member with good antireflection performance and to an optical element and a display device including such an antireflective member. The present technology also relates to a method of making a stamper (which will also be referred to herein as a "mold" or a "die"), a method of making an antireflective member using the stamper, and to an antireflective member.

2. Description of the Related Art

Display devices for use in TVs, cellphones and so on and optical elements such as camera lenses usually adopt antireflection technology to cut down the surface reflection and transmit the incoming light as much as possible. This is because when light passes an interface between two media with mutually different refractive indices (e.g., when light enters an interface between the air and glass), the percentage of the light transmitted decreases due to Fresnel reflection and other types of reflection, thus affecting the visibility.

As a method of applying the antireflection technology, an antireflective multilayer coating, which is a stack of a number of thin films made of inorganic particles of silica or organic particles of acrylic resin, for example, may be deposited on the surface of a substrate. However, such an antireflective multilayer coating is often deposited by an evaporation process, for example, which means it takes a lot of time and cost to finish such a process. Particularly under an environment where the ambient light is very intense, the antireflection performance needs to be further enhanced. In that case, the number of thin films stacked in the antireflective multilayer coating should be increased to further raise the cost eventually. Besides, since the antireflective multilayer coating utilizes the interference phenomenon of light, its antireflection performance heavily depends on the angle of incidence and wavelength of incoming light. That is why if the angle of incidence or wavelength of incoming light were outside of its preset range, then the antireflection performance would decline significantly.

The antireflection technology may also be applied by forming a fine uneven surface pattern, of which the periods are controlled to be equal to or shorter than the wavelength of visible radiation, on the surface of a substrate (see Patent Documents Nos. 1 to 5). This method utilizes the principle of a so-called "motheye" structure, in which the refractive indices with respect to light that has entered a substrate are changed continuously in the depth direction of the unevenness from the refractive index of the incidence medium to that of the substrate, thereby cutting down reflections in the target wavelength range. As the uneven surface patterns, cones, pyramids and other shapes with a sharpened top are shown as examples (see Patent Documents Nos. 3 to 5).

Hereinafter, it will be described with reference to FIGS. 11(a) and 11(b) exactly how the antireflectivity is realized by forming such a fine uneven pattern. FIG. 11(a) is a cross-sectional view schematically illustrating a substrate on which an uneven surface pattern with a rectangular cross section has been formed. FIG. 11(b) is a cross-sectional view schematically illustrating a substrate on which an uneven surface pattern with a triangular cross section has been formed.

First, referring to FIG. 11(a), the substrate 1 including such a rectangular unevenness 2 thereon will have the same function as a substrate including a single-layer thin film thereon.

The antireflectivity of a single-layer thin film will be described briefly. Suppose visible radiation with a wavelength $\lambda$ is going to be incident on a glass substrate on which a single-layer thin film with a thickness d is deposited. To reduce the reflection of a perpendicularly incoming light ray (with an angle of incidence of zero degrees) to zero, a single-layer thin film that causes interference between the light reflected from the surface of the thin film and the light reflected from the thin film-glass substrate interface needs to be formed such that these two types of reflected light cancel each other. More specifically, the thickness d and the refractive index n of the single-layer thin film may be defined as $d=\lambda/4n$ and $n=(n_i \times n_s)^{1/2}$ where $n_i$ is the refractive-index of the air and $n_s$ is the refractive index of glass. Since the refractive index $n_i$ of the air is 1.0 and the refractive index $n_s$ of glass is approximately 1.5, the refractive index n of the single-layer thin film calculates, approximately 1.22. Therefore, theoretically speaking, if a single-layer thin film, of which the thickness is equal to a quarter wavelength and which has a refractive index of about 1.22, is formed on the surface of a glass substrate, the reflection should be eliminated totally. Actually, however, organic materials for use to make thin films have as high refractive indices as about 1.5 or more and even inorganic materials, of which the refractive indices are smaller than those of organic materials, have refractive indices of approximately 1.3. That is why actually it is impossible to make such a substrate.

Next, the antireflection function caused by the very small rectangular unevenness 2 such as that shown in FIG. 11(a) will be described. In that case, the same effects as those achieved by forming a single-layer thin film with a refractive index of about 1.22 can be achieved, and the reflection can be totally eliminated, by optimizing the period of the unevenness. Nevertheless, as in the situation where the single-layer thin film is used, it is still difficult to realize the antireflection function in a broad wavelength range or with little dependence on the angle of incidence.

On the other hand, if the unevenness has a triangular cross section as shown in FIG. 11(b), the refractive indices with respect to the light that has entered the substrate change in the depth direction of the unevenness. As a result, the surface reflection decreases. Besides, if an uneven surface pattern such as that shown in FIG. 11(b) is formed, such an uneven surface pattern not just realizes the antireflection function in a broader wavelength range with much less dependence on the angle of incidence than the antireflective multilayer coating described above, but also is applicable to a lot of materials and can be arranged directly on a substrate. Consequently, a high-performance antireflective member can be provided at a reduced cost.

The motheye structure is usually formed by transferring the inverted fine uneven surface pattern from the surface of a stamper (which is a mold or a die) onto a light transmitting resin by an embossing process, an injection molding process or a casting process, for example.

In the prior art, the stamper is ordinarily made by a laser interference exposure process or an electron beam (EB) exposure process. According to any of these methods, however, it is totally impossible, or at least very difficult, to make a stamper with a large area.

Meanwhile, Patent Document No. 6 discloses a method of mass-producing stampers at a reduced cost by using anodized porous alumina, which is obtained by anodizing aluminum.

The anodized porous alumina, obtained by anodizing aluminum, will be described briefly here. A method of making a porous structure by anodization has attracted attraction as a simple method for making nanometer-scale columnar micropores that are arranged regularly. Specifically, a base material is immersed in either an acidic electrolytic solution such as sulfuric acid, oxalic acid or phosphoric acid or an alkaline electrolytic solution and a voltage is applied thereto using the base material as an anode. Then, oxidation and dissolution will advance in parallel on the surface of the base material. In this manner, an oxidized coating with micropores can be formed on the surface. Those columnar micropores will be aligned perpendicularly to the oxide film and exhibit self-organized regularity under certain conditions (including voltage, type of the electrolytic solution and temperature). Thus, this anodized porous alumina is expected to be applied to various functional materials.

As schematically illustrated in FIG. 12, the anodized porous alumina layer 10 consists of cells 16 of a predetermined size, each including a micropore 12 and a barrier layer 14. If the porous alumina layer is made under particular conditions, each cell 16 thereof has a substantially square hexagonal shape when viewed perpendicularly to the film plane. Also, when viewed perpendicularly to the film plane, the cells 16 are arranged two-dimensionally so as to be packed as densely as possible. Each cell 16 has a micropore 12 at the center and the micropores 12 are arranged periodically. As used herein, if the micropores 12 are arranged "periodically", then the sum of the vectors from the geometric centroid (which will be simply referred to herein as a "centroid") of a micropore toward the respective centroids of all of its adjacent micropores becomes equal to zero when viewed perpendicularly to the film plane. In the example illustrated in FIG. 12, the six vectors from the centroid of a micropore 12 toward those of its six adjacent micropores 12 have the same length and their directions are different from each other by 60 degrees apiece. Thus, the sum of these vectors is equal to zero. In an actual porous alumina layer, if the sum of these vectors is less than 5% of the total length of vectors, then it can be determined that the arrangement has periodicity.

The porous alumina layer 10 is formed by anodizing the surface of aluminum, and therefore, is arranged on an aluminum layer 18.

The cells 16 are formed as a result of local film dissolution and growth, which advance in parallel at the bottom of the micropores (i.e., in the so-called "barrier layer" 14). It is known that the size of each cell 16 (i.e., the pitch between two adjacent micropores 12) is approximately twice as large as the thickness of the barrier layer 14 and is almost proportional to the voltage applied during the anodization. It is also known that the diameter of the micropores 12 depends on the type, concentration, temperature and other parameters of the electrolytic solution but is normally about one-third of the size of each cell 16 (which is the longest diagonal of the cell 16 as viewed perpendicularly to the film plane).

In such porous alumina, the micropores that have been made under particular conditions have high regularity. But depending on the conditions, an arrangement of micropores with a somewhat decreased degree of regularity may also be tolerated.

Patent Document No. 6 discloses, as one of its working examples, (1) a method of forming fine unevenness on the surface of a Si wafer by dry-etching the Si wafer using an anodized porous alumina on the Si wafer as a mask. The patent document also discloses (2) a method of forming fine unevenness on the surface of an Al plate by forming anodized porous alumina on the surface of the Al plate and dry-etching metal Al using the anodized porous alumina as a mask. The document further discloses (3) a method of making unevenness on the surface of an Al plate by forming anodized porous alumina on the Al plate and dry-etching the alumina layer.

Patent Document No. 1: PCT International Application Japanese National Stage Publication No. 2001-517319
Patent Document No. 2: Japanese Patent Application Laid-Open Publication No. 2004-205990
Patent Document No. 3: Japanese Patent Application Laid-Open Publication No. 2004-287238
Patent Document No. 4: Japanese Patent Application Laid-Open Publication No. 2001-272505
Patent Document No. 5: Japanese Patent Application Laid-Open Publication No. 2002-286906
Patent Document No. 6: Japanese Patent Application Laid-Open Publication No. 2003-43203
Non-Patent Document No. 1: Masuda et al., Proceedings of the $52^{nd}$ Meeting of Applied Physics Related Societies of Japan (at University of Saitama, spring 2005), 30p-ZR-9, p. 1112

These antireflection techniques disclosed in Patent Documents Nos. 1 to 5, however, have the following drawbacks.

First of all, in the conventional uneven surface patterns, diffracted light, consisting essentially of short-wave light rays, tends to be produced at a particular angle (i.e., depending on the angle of incidence), thus decreasing the visibility eventually. Particularly when an antireflective member with such a fine uneven surface pattern is used in a display device, bluish diffracted light will be produced to decrease the visibility significantly.

Secondly, the antireflection function against regularly reflected (i.e., zero-order reflected) diffracted light is insufficient. For example, if an antireflective member is adopted in a mobile display to be used outdoors under intense sunlight, then the visibility decreases significantly. It is known that to enhance the antireflectivity, the aspect ratio of the uneven surface pattern (i.e., the ratio of the height to the period of the unevenness) may be increased. The uneven surface pattern is usually formed by a transfer process using a stamper in view of the mass productivity and other considerations. However, it is very difficult to make a stamper that will define unevenness with such a large aspect ratio. Also, even if such a stamper could be made successfully, it would be difficult to transfer the uneven surface pattern accurately enough. For that reason, if an antireflective member is made by a transfer process, the desired antireflectivity cannot be realized in many cases.

Besides, Methods Nos. (1), (2) and (3) of making a stamper as disclosed in Patent Document No. 6 use a dry process, which requires expensive equipment. In addition, since there is a restriction due to the size of the equipment, it is difficult to make a stamper with a large area or a stamper of a special shape such as a roll.

In order to overcome the problems described above, a primary feature of the present technology is to provide an antireflective member that can minimize the production of diffracted light, consisting essentially of short-wave light components, in a broad range of angles of incidence, can eliminate the regular reflection and can still achieve expected antireflectivity even when made by a transfer process.

Another feature of the present technology is to provide a method of making a stamper that can be used effectively to make a stamper with a large area or of a special shape. A more specific feature of the present technology is to provide a stamper that can be used effectively to make the uneven surface pattern of an antireflective member with a motheye structure and also provide a method of making such a stamper.

SUMMARY

An antireflective member according to an example embodiment presented herein has an uneven surface pattern, in which unit structures are arranged in x and y directions at respective periods that are both shorter than the shortest wavelength of an incoming light ray, on the surface of a substrate. The member satisfies the following Inequality (1):

$$\frac{\Lambda x, y}{\lambda_{min}} < \frac{1}{ni + ni \cdot \sin\theta i_{max}} \quad (1)$$

where $\lambda_{min}$ is the shortest wavelength of the incoming light ray, $\theta i_{max}$ is the largest angle of incidence of the incoming light ray, ni is the refractive index of an incidence medium, ns is the refractive index of the antireflective member, $\Lambda x$ is the period of the uneven surface pattern in the x direction, and $\Lambda y$ is the period of the pattern in the y direction. In the following description, $\Lambda x$ and $\Lambda y$ will be collectively referred to as "$\Lambda x, y$".

In one preferred embodiment, Inequality (1) further satisfies the following Inequality (2):

$$\frac{\Lambda x, y}{\lambda_{min}} < \frac{1}{\max\{ni, ns\} + ni \cdot \sin\theta i_{max}} \quad (2)$$

where max{ni, ns} means selecting either ni or ns that has the higher refractive index.

In another preferred embodiment, if an axis of coordinates defined in the height direction of the uneven surface pattern is h-axis and if the highest-level point of raised portions of the uneven surface pattern is defined by h=d and if the lowest-level point of recessed portions of the uneven surface pattern is defined by h=0, then an effective refractive index $n_{eff}(h)$, represented as a function of h, satisfies the following Equations (3):

$$n_{eff}(h=0) \approx ns$$

and $$n_{eff}(h=d) \approx ni \quad (3)$$

In this particular preferred embodiment, the differential coefficient $dn_{eff}(h)/dh$ of the effective refractive index $n_{eff}(h)$ satisfies the following Equation (4):

$$dn_{eff}(h)/dh \approx \{(n_{eff}(h=0) - n_{eff}(h=d))/d\} \quad (4)$$

In an alternative preferred embodiment, the effective refractive index $n_{eff}(h)$ has at least one intersection with a function $N_{eff}(h)$ given by the following Equation (5):

$$N_{eff}(h) = \{(n_{eff}(h=0) - n_{eff}(h=d))/d\} \times h + n_{eff}(h=0) \quad (5)$$

and further satisfies the following Inequality (6):

$$|N_{eff}(h) - n_{eff}(h)| \leq |n_{eff}(h=d) - n_{eff}(h=0)| \times 0.2 \quad (6)$$

In still another preferred embodiment, if an axis of coordinates defined in the height direction of the uneven surface pattern is h-axis and if the highest-level point of raised portions of the uneven surface pattern is defined by h=d and if the lowest-level point of recessed portions of the uneven surface pattern is defined by h=0, then each said raised portion substantially makes a point contact with an xy plane where h=d and each said recessed portion substantially makes a point contact with an xy plane where h=0.

In this particular preferred embodiment, the recessed portions are arranged symmetrically to the raised portions with respect to an xy plane where h=d/2 is satisfied.

In yet another preferred embodiment, the raised portions of the uneven surface pattern have a stepped side surface.

An optical element includes an antireflective member according to any of the preferred embodiments described above.

A display device according to an example embodiment includes the optical element of the present embodiment.

A method of making a stamper according to an example embodiment is designed to make a stamper that has a fine uneven surface structure. The method includes the steps of: (a) providing a base, of which the surface has an aluminum layer including at least 95 mass % of aluminum; (b) anodizing the aluminum layer partially, thereby forming a porous alumina layer with a plurality of very small recessed portions; and (c) bringing the porous alumina layer into contact with an alumina etchant to expand the very small recessed portions of the porous alumina layer. A plurality of very small recessed portions, each having a stepped side surface, are formed on the porous alumina layer by alternately and repeatedly performing the steps (b) and (c) a number of times. If the aluminum layer includes a non-aluminum element, the aluminum layer preferably includes 1 mass % to less than 5 mass % of Ti and/or Si. The aluminum layer may include 99.99 mass % or more of aluminum.

In one preferred embodiment, the repetition of the steps (b) and (c) ends with the step (b).

In another preferred embodiment, the deepest part of the very small recessed portions substantially defines a point.

In still another preferred embodiment, some of the very small recessed portions are surrounded with three to six very small raised portions.

In yet another preferred embodiment, the base further includes an electrically conductive metal layer or semiconductor layer as an undercoat layer for the aluminum layer. Examples of preferred electrically conductive metals include platinum (Pt), gold (Au), silver (Ag) and copper (Cu). On the other hand, silicon (Si) is preferably used as a material for the electrically conductive semiconductor layer.

In yet another preferred embodiment, the metal layer is made of a valve metal. As used herein, the "valve metal" is a generic term of various anodizable metals, which include not only aluminum but also tantalum (Ta), niobium (Nb), molybdenum (Mo), titanium (Ti), hafnium (Hf), zirconium (Zr), zinc (Zn), tungsten (W), bismuth (Bi) and antimony (Sb). Among other things, tantalum (Ta), niobium (Nb), molybdenum (Mo), titanium (Ti) and tungsten (W) are preferred.

In yet another preferred embodiment, the method further includes the step of forming a high-hardness metal layer over the porous alumina layer after the very small recessed portions with the stepped side surface have been formed on the porous alumina layer.

In yet another preferred embodiment, the method further includes the step of subjecting the porous alumina layer to a surface treatment after the very small recessed portions with the stepped side surface have been formed on the porous alumina layer.

In yet another preferred embodiment, the base has either a columnar shape or a cylindrical shape, and the surface thereof defines the outer surface of the base, on which the very small recessed portions are arranged seamlessly.

In yet another preferred embodiment, the base has a cylindrical shape, and the surface thereof defines the inner surface of the base, on which the very small recessed portions are arranged seamlessly.

In yet another preferred embodiment, the aluminum layer of the base has another uneven structure with a size that is greater than 780 nm.

In yet another preferred embodiment, the very small recessed portions of the fine uneven surface structure have a gap of 100 nm to 200 nm between adjacent ones thereof.

In yet another preferred embodiment, the very small recessed portions of the fine uneven surface structure are arranged so as to have no periodicity.

In yet another preferred embodiment, the method further includes the step of making a metallic stamper by using either the porous alumina layer, on which the very small recessed portions with the stepped side surface have been formed, or a member on which the surface structure of the porous alumina layer has been transferred.

A method of making an antireflective member according to an example embodiment is carried out using a stamper. The method includes the steps of: making the stamper by one of the methods described above; and transferring the fine uneven surface structure of the stamper.

A stamper according to the present embodiment has a fine uneven surface structure and includes a base, an aluminum layer, which is arranged on the base and includes at least 95 mass % of aluminum, and a porous alumina layer, which is arranged on the aluminum layer. The porous alumina layer has a plurality of very small recessed portions, each having a stepped side surface. If the aluminum layer includes a non-aluminum element, the aluminum layer preferably includes 1 mass % to less than 5 mass % of Ti and/or Si. The aluminum layer may include 99.99 mass % or more of aluminum.

In one preferred embodiment, the deepest part of the very small recessed portions substantially defines a point.

In another preferred embodiment, some of the very small recessed portions are surrounded with three to six very small raised portions.

In still another preferred embodiment, the base further includes an electrically conductive metal layer or semiconductor layer as an undercoat layer for the aluminum layer.

In yet another preferred embodiment, the metal layer is made of a valve metal.

In yet another preferred embodiment, the stamper further includes a high-hardness metal layer over the porous alumina layer.

In yet another preferred embodiment, the fine uneven surface structure has been subjected to a surface treatment. The surface treatment may be a mold releasing treatment that is carried out to make the pattern transferable more easily.

In yet another preferred embodiment, the base has either a columnar shape or a cylindrical shape, and the surface thereof defines the outer surface of the base, on which the very small recessed portions are arranged seamlessly.

In yet another preferred embodiment, the base has a cylindrical shape, and the surface thereof defines the inner surface of the base, on which the very small recessed portions are arranged seamlessly.

In yet another preferred embodiment, the aluminum layer of the base has another uneven structure with a size that is greater than 780 nm. If an antireflective member is made using this stamper, the fine uneven surface structure realizes the antireflection function and that another uneven structure realizes an antiglare function.

In yet another preferred embodiment, the very small recessed portions of the fine uneven surface structure have a gap of 100 nm to 200 nm between adjacent ones thereof. If an antireflective member is made using such a stamper, diffraction of reflected light can be reduced effectively.

In yet another preferred embodiment, the very small recessed portions of the fine uneven surface structure are arranged so as to have no periodicity. If an antireflective member is made using such a stamper, diffraction of reflected light can be reduced effectively.

Another antireflective member according to the present embodiment has a fine uneven surface structure. The fine uneven surface structure has a plurality of very small raised portions, each having a stepped side surface.

In one preferred embodiment, some of the very small raised portions are surrounded with three to six very small recessed portions.

In another preferred embodiment, the antireflective member satisfies the following Inequality (1'):

$$\frac{P}{\lambda_{min}} < \frac{1}{ni + ni \cdot \sin\theta i_{max}} \quad (1')$$

where P is the distance between any two adjacent ones of the very small raised portions, $\lambda_{min}$ is the shortest wavelength of an incoming light ray, $\theta i_{max}$ is the largest angle of incidence of the incoming light ray, ni is the refractive index of an incidence medium, and ns is the refractive index of the antireflective member.

In this particular preferred embodiment, Inequality (1') further satisfies the following Inequality (2'):

$$\frac{P}{\lambda_{min}} < \frac{1}{\max\{ni, ns\} + ni \cdot \sin\theta i_{max}} \quad (2')$$

where max{ni, ns} means selecting either ni or ns that has the higher refractive index.

The present embodiment provides an antireflective member that shows little dependence on the angle of incidence over a broad wavelength range. Also, the present embodiment provides an antireflective member that can reduce the regular reflection so significantly as to be used effectively in a mobile device such as a cellphone that should operate under an environment with very intense ambient light.

Furthermore, the present embodiment provides an antireflective member that realizes excellent antireflection function even when made by a transfer process.

Besides, the present embodiment provides a method of making a stamper that can be used effectively to make a stamper with a large area or of a special shape (e.g., a roll shape). Since the very small recessed portions of the stamper have a stepped shape, the specific surface is wide enough. As a result, the surface treatment achieves remarkable effects.

What is more, according to the present embodiment, an antireflective member with a large area can be made easily. On top of that, since the very small raised portions of the antireflective member of the present invention may have a stepped side surface, of which the size is sufficiently smaller than the wavelength of visible radiation, the reflection of light (i.e., zero-order reflection and diffraction) occurs less easily than an antireflective member of the same pitch and same height. It is also possible to make an antireflective member, of which the very small raised portions have no periodicity on the surface. And such an antireflective member does not diffract light so easily.

BRIEF DESCRIPTION OF THE DRAWINGS

FIG. 5(a) is a perspective view schematically illustrating a configuration for an antireflective member including conical structures on the surface of a substrate.

FIG. 5(b) is a perspective view schematically illustrating a configuration for an antireflective member including quadrangular pyramidal structures on the surface of a substrate.

FIG. 5(c) is a graph showing how the effective refractive index $n_{eff}(h)$ changes with the height h/d of the unevenness in the antireflective members shown in FIGS. 5(a) and 5(b).

FIG. 5(d) is a graph showing how the zero-order reflection and diffraction efficiency changes with the height of the unevenness, which is represented as a ratio to the wavelength λ of the incoming light, in the antireflective members shown in FIGS. 5(a) and 5(b).

FIG. 7(a) is a graph showing how the effective refractive index $n_{eff}(h)$ changes with the height h/d of the unevenness in Structures A through E.

FIG. 7(b) is a graph showing the projections of the uneven surface patterns of Structures A through E onto an xh plane.

FIG. 7(c) is a graph showing how the zero-order reflection and diffraction efficiency changes with the height d/λ of the unevenness, which is represented as a ratio to the wavelength λ of the incoming light, in Structures A through E.

FIGS. 21(a), 21(b) and 21(c) are micrographs showing a front view, a perspective view and a cross-sectional view of an uneven surface structure on the surface of a stamper according to a specific example of the present embodiment.

DETAILED DESCRIPTION OF PREFERRED EMBODIMENTS

Embodiment 1

Hereinafter, a first specific preferred embodiment of an antireflective member will be described with reference to the accompanying drawings. The antireflective member of this preferred embodiment has an uneven surface pattern, in which unit structures are arranged at respective periods that are both shorter than the wavelength of an incoming light ray, on the surface of a substrate. The member satisfies the following Inequality (1):

$$\frac{\Lambda x, y}{\lambda_{min}} < \frac{1}{ni + ni \cdot \sin\theta i_{max}} \tag{1}$$

where $\lambda_{min}$ is the shortest wavelength of the incoming light ray, $\theta i_{max}$ is the largest angle of incidence of the incoming light ray, ni is the refractive index of an incidence medium, ns is the refractive index of the antireflective member, $\Lambda x$ is the period of the uneven surface pattern in the x direction and $\Lambda y$ is the period of the uneven surface pattern in the y direction. In the following description, $\Lambda x$ and $\Lambda y$ will be collectively represented as "$\Lambda x, \Lambda y$".

The antireflective member of this preferred embodiment can minimize the production of diffracted light that travels to a particular angle depending on the angle of incidence.

Figure 1:
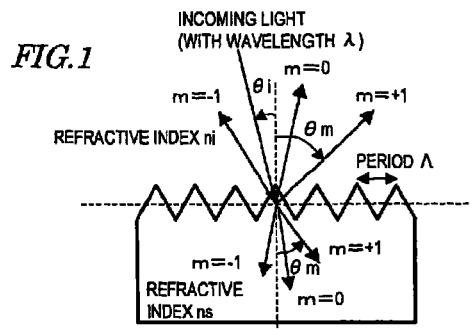
FIG. 1 is a cross-sectional view showing the path of a light ray with a wavelength λ that has entered a substrate with a fine uneven surface pattern.

First, it will be described with reference to FIG. 1 where a light ray with a wavelength $\lambda$ will go after having entered an antireflective member including a fine uneven surface pattern thereon. FIG. 1 illustrates the structure of an antireflective member on which an uneven surface pattern is arranged one-dimensionally for convenience sake. If a one-dimensional uneven surface pattern such as that shown in FIG. 1 has been defined, then there will be a difference in refractive index between the TE (electric field) mode and the TM (magnetic field) mode. If the antireflective member has a two-dimensional uneven surface pattern, however, the refractive index will have no such difference but will be isotropic.

If the light has been incident on the antireflective member as shown in FIG. 1, diffracted light rays of various orders will be produced in the light reflected and in the light transmitted. Those light rays will be referred to herein as "reflected diffracted light ray" and "transmitted diffracted light ray", respectively. If the refractive index of the incidence medium (which is the air in this example) is ni and the refractive index of the antireflective member with the uneven surface pattern is ns, the reflected diffracted light ray and the transmitted diffracted light ray satisfy the following Equations (5-1) and (5-2) in accordance with the Grating Equations:

$$ni \cdot \sin\theta m - ni \cdot \sin\theta i = m\frac{\lambda}{\Lambda} \tag{5-1}$$

$$ns \cdot \sin\theta m - ni \cdot \sin\theta i = m\frac{\lambda}{\Lambda} \tag{5-2}$$

where m is the order of diffraction (which is an integer such as 0, ±1 or ±2), $\lambda$ is the wavelength of the incoming light ray, $\Lambda$ is the period of the unevenness, $\theta i$ is the angle of incidence, and $\theta m$ is the angle of $m^{th}$-order diffraction. The orders of diffraction are supposed to be shown in the order shown in FIG. 1 and $\theta i$ and $\theta m$ are measured with the direction pointed by the arrow in FIG. 1 regarded as positive.

As can be seen from these Equations, as the wavelength $\lambda$ of the incoming light ray increases (or as the period $\Lambda$ of unevenness shortens), both of the reflected diffracted light ray and the transmitted diffracted light ray gradually change from a high-order diffracted light ray with a high order of diffraction into an evanescent light ray (i.e., a light ray that never propagates). That is why if the period of the unevenness is much shorter than the wavelength of the incoming light ray, even the first-order diffracted light turns into the evanescent light ray and only zero-order diffracted light rays (i.e., transmitted diffracted light ray and reflected diffracted light ray) will be produced. As a result, the visibility improves.

Taking these into account, the major factor that causes the decrease in visibility in the conventional antireflective member would be minus-first-order and other reflected diffracted light rays consisting essentially of short-wave light rays (blue) that propagate to a particular angle of diffraction $\theta$ depending on the angle of incidence $\theta i$. From this standpoint, the present inventors defined Equation (1) as a condition for making the minus-first-order and all the other reflected diffracted light rays evanescent light rays and letting only the zero-order diffracted light ray (i.e., the regularly reflected light ray) propagate.

It should be noted that Equation (1) was defined as a condition for letting only the zero-order diffracted light propagate just in the reflected light by using the period $\Lambda$ of unevenness and the wavelength $\lambda$ of the incoming light ray. Therefore, non-zero-order diffracted light rays might sometimes be produced in the transmitted light. If there is the minus-first-order transmitted diffracted light, then the visibility might decrease.

To guarantee even better visibility, only the zero-order diffracted light is preferably allowed to propagate not only in the reflected light but also in the transmitted light. Thus, by modifying Equation (1), the present inventors set a condition for letting the zero-order reflected diffracted light ray and the zero-order transmitted diffracted light ray propagate as the following Equation (2):

$$\frac{\Lambda x, y}{\lambda_{min}} < \frac{1}{\max\{ni, ns\} + ni \cdot \sin\theta i_{max}} \tag{2}$$

where max{ni, ns} means selecting either ni or ns that has the higher refractive index.

Next, it will be described with reference to FIGS. 2(a) and 2(b) how the production of the minus-first-order light can be minimized by controlling the period of unevenness to the range defined by Equation (1), more preferably to the range defined by Equation (2).

In the following example, suppose visible radiation with a wavelength λ of 380 nm to 780 nm has been incident on the uneven surface pattern of a substrate (with a refractive index ns≈1.5) from every direction (i.e., 0<θ<90 degrees) in the air (with a refractive index ni≈1.0).

Figures 2A, 2B:
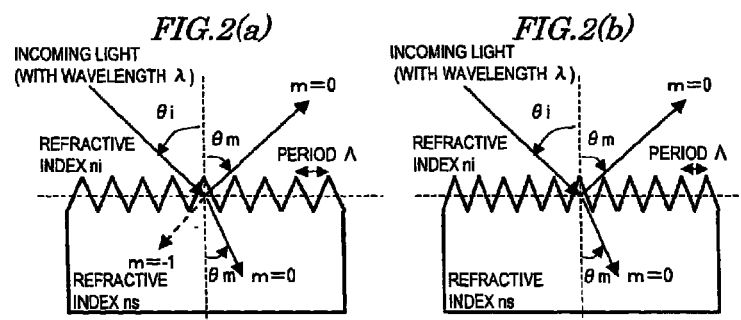
FIG. 2(a) is a cross-sectional view showing how a zero-order reflected and diffracted light ray, a zero-order transmitted and diffracted light ray, and a minus-first-order transmitted and diffracted light ray propagate through an antireflective member.
FIG. 2(b) is a cross-sectional view showing how a zero-order reflected and diffracted light ray and a zero-order transmitted and diffracted light ray propagate through an antireflective member.

First, a condition for eliminating only the minus-first-order reflected diffracted light and letting the zero-order reflected diffracted light and zero-order transmitted diffracted light propagate as shown in FIG. 2(a) is calculated based on Equation (1). By substituting $\theta i_{max}=90$ degrees and ni=1.0 into Equation (1), the following Equation (7) can be derived:

$$\frac{\Lambda x, y}{\lambda_{min}} < \frac{1}{2} \quad (7)$$

That is to say, by setting both of the periods Λx and Λy of unevenness to be less than a half of the shortest wavelength λmin (=380 nm) of the incoming light ray (i.e., to less than 190 nm), it is possible to prevent the minus-first-order reflected diffracted light from being produced.

Next, a condition for eliminating not only the minus-first-order reflected diffracted light but also the minus-first-order transmitted diffracted light and letting the zero-order reflected diffracted light and zero-order transmitted diffracted light propagate as shown in FIG. 2(b) is calculated based on Equation (2). By substituting $\theta i_{max}=90$ degrees, ni=1.0 and max{ni, ns}=1.5 into Equation (2), the following Equation (8) can be derived:

$$\frac{\Lambda x, y}{\lambda_{min}} < \frac{2}{5} \quad (8)$$

That is to say, by setting both of the periods Λx and Λy of unevenness to be less than two-fifths of the shortest wavelength λmin (=380 nm) of the incoming light ray (i.e., to less than 152 nm), it is possible to prevent the minus-first-order transmitted diffracted light from being produced, too. As a result, an antireflective member that ensures even better visibility is realized.

In the example described above, calculations are done with the shortest wavelength λ min of visible radiation supposed to be equal to 380 nm. However, the range of visible radiation, of which the reflection should be minimized, varies with the specific application of the antireflective member. Thus, λmin may be set in an appropriate range in view of those considerations.

For example, to minimize the reflection of visible radiation with wavelengths of 400 nm or more (i.e., λmin=400 nm) in the example described above, a condition for eliminating only the minus-first-order reflected diffracted light should be controlling both Λx and Λy to less than 200 nm in accordance with Equation (7). On the other hand, a condition for eliminating both the minus-first-order reflected diffracted light and the minus-first-order transmitted diffracted light should be controlling both Λx and Λy to less than 160 nm in accordance with Equation (8).

Hereinafter, the antireflectivity of the antireflective member of this preferred embodiment will be described in detail with reference to FIG. 3.

Figure 3:
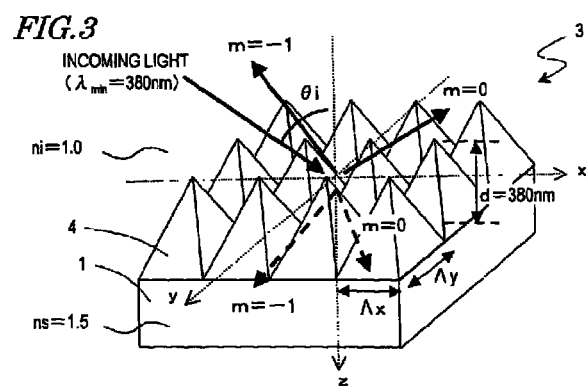
FIG. 3 is a perspective view schematically illustrating a configuration for an antireflective member according to a first specific preferred embodiment.

FIG. 3 is a perspective view schematically illustrating a configuration for an antireflective member according to this preferred embodiment. As shown in FIG. 3, pyramidal structures 4 are arranged on the surface of a substrate 1 at periods Λx and Λy in the x and y directions, respectively, so as to define an uneven surface pattern thereon. The pyramidal structures 4 have a height d of 380 nm and the antireflective member 3 including the pyramidal structures 4 has a refractive index of 1.5. In this example, Antireflective Members I, II and III are made such that Λx=Λy=200 nm, 180 nm or 150 nm is satisfied.

In these three types of antireflective members, Antireflective Member II (in which Λx=Λy=180 nm) is an example of this preferred embodiment that satisfies Equation (1) but does not satisfy Equation (2). Λx and Λy of Antireflective Member II are set such that the values figured out by substituting $\theta i_{max}=85$ degrees, ni=1.0 and λmin=380 nm into Equation (1) fall within the range defined by Equation (1).

Antireflective Member III (in which Λx=Λy=150 nm) is a preferred example of this preferred embodiment that satisfies Equation (2). Λx and Λy of Antireflective Member III are set such that the values figured out by substituting $\theta i_{max}=85$ degrees, ni=1.0, λmin=380 nm and max{ni, ns}=1.5 into Equation (2) fall within the range defined by Equation (2).

Meanwhile, Antireflective Member I is a comparative example that satisfies neither Equation (1) nor Equation (2).

Visible radiation with a wavelength λ (where λmin=380 nm) was incident from almost every direction (where 0<θi<85 degrees) in the air (with a refractive index ni=1.0) onto these antireflective members. And the diffraction efficiencies of respective orders were calculated by making diffraction efficiency simulations according to the vector diffraction theory. The diffraction efficiency can be calculated based on the vector diffraction theory or the scalar diffraction theory. According to the vector diffraction theory, however, even if the period of unevenness is much shorter than the wavelength of the incoming light as in this preferred embodiment, the diffraction efficiency can be calculated almost accurately. On the other hand, the scalar diffraction theory is applicable only when the period of unevenness is sufficiently longer than the wavelength of the incoming light, and therefore, is not adopted for this preferred embodiment. According to the vector diffraction theory, the diffraction efficiency is calculated based on the polarization and angle of incidence of the incoming light, the period of the uneven surface pattern, the refractive index of the substrate and other parameters. For further details, see M. G. Moharam, Coupled-Wave Analysis of Two-Dimensional Dielectric Gratings, SPIE 883 (1988), pp. 8-11, for example.

Figure 4A:
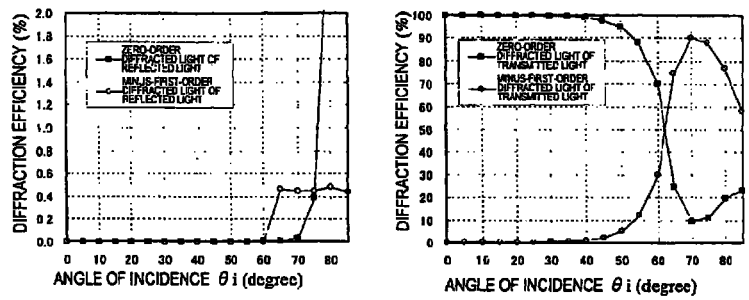
FIG. 4(a) is a graph showing the diffraction efficiency of Antireflective Member I.
Figure 4B:
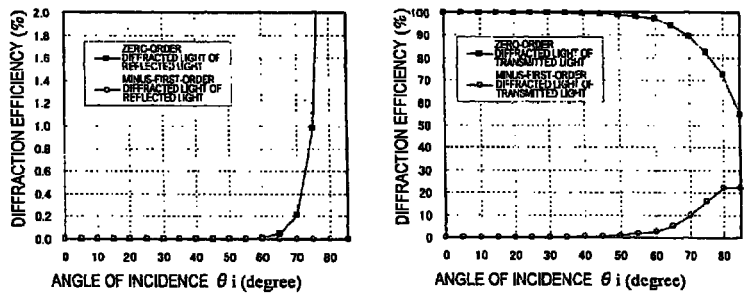
FIG. 4(b) is a graph showing the diffraction efficiency of Antireflective Member II.
Figure 4C:
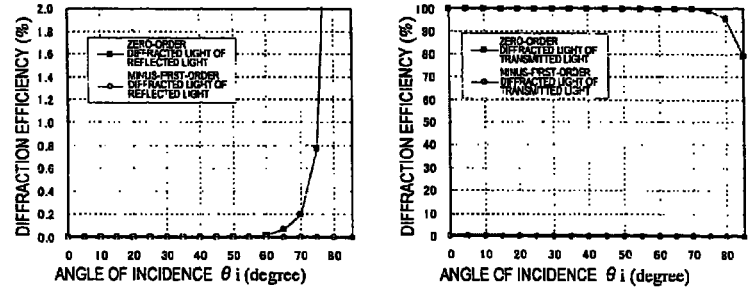
FIG. 4(c) is a graph showing the diffraction efficiency of Antireflective Member III.

The diffraction efficiencies of Antireflective Members I, II and III are shown in FIGS. 4(a), 4(b) and 4(c), respectively. In each of FIGS. 4(a) through 4(c), the graph on the left-hand side shows data about the zero-order and minus-first-order diffracted light rays that were included in the reflected light, while the graph on the right-hand side shows data about the zero-order and minus-first-order diffracted light rays that were included in the transmitted light. These results reveal that if the minus-first-order diffraction efficiency can be reduced to almost zero percent at every angle of incidence, then excellent antireflection function is realized in a broad wavelength range.

If Antireflective Member I that did not satisfy the requirements of this preferred embodiment was used, the minus-first-order diffracted light was produced in both the reflected light and the transmitted light when the angle of incidence reached the range of approximately 50 to 60 degrees as shown in FIG. 4(a). Particularly when the angle of incidence exceeded approximately 50 degrees, the minus-first-order transmitted diffracted light was produced much more profusely. Thus, it can be seen that Antireflective Member I could not control the minus-first-order diffracted light at all.

On the other hand, if Antireflective Member II that satisfied Equation (1) was used, no minus-first-order reflected diffracted light was produced at all at any angle of incidence as shown in FIG. 4(b). Nevertheless, the minus-first-order transmitted diffracted light was produced when the angle of incidence exceeded approximately 60 degrees.

And if Antireflective Member III that satisfied both of Equations (1) and (2) was used, no minus-first-order diffracted light was produced at all as shown in FIG. 4(c).

As can be seen from these results, according to this preferred embodiment, the minus-first-order diffracted light can be eliminated irrespective of the angle of incidence, and therefore, an antireflective member that guarantees good visibility can be provided.

Embodiment 2

Hereinafter, a second specific preferred embodiment of an antireflective member will be described. The antireflective member of this preferred embodiment is a variation of the antireflective member of the first preferred embodiment that satisfies Equation (1) (more preferably Equation (2)). And if an axis of coordinates defined in the height direction of the uneven surface pattern is h-axis; the highest-level point of raised portions of the uneven surface pattern is defined by h=d; and the lowest-level point of recessed portions of the uneven surface pattern is defined by h=0, then an effective refractive index $n_{eff}(h)$, represented as a function of h, further satisfies the following Equations (3):

$$n_{eff}(h=0) \approx ns \text{ and } n_{eff}(h=d) \approx ni \quad (3)$$

The antireflective member of this preferred embodiment can reduce the production of regular reflection (i.e., zero-order reflected diffracted light) sufficiently.

The effective refractive index is determined by the fill factor of the unevenness to the incidence medium (such as the air). As to a specific method of calculating the effective refractive index, see P. Lalanne et al., J. Modern Optics, Vol. 43, No. 10, p. 2063 (1996), for example. A method of designing an uneven surface pattern based on the effective refractive index is known as a simple and convenient method for reproducing the diffraction phenomenon of an uneven surface pattern almost accurately although such a phenomenon is usually difficult to analyze.

In Equation (3), $n_{eff}(h=0) \approx ns$ means that $n_{eff}(h=0)=ns\pm7\%$ and $n_{eff}(h=d) \approx ni$ means that $n_{eff}(h=d)=ni\pm7\%$.

Figure 6A:
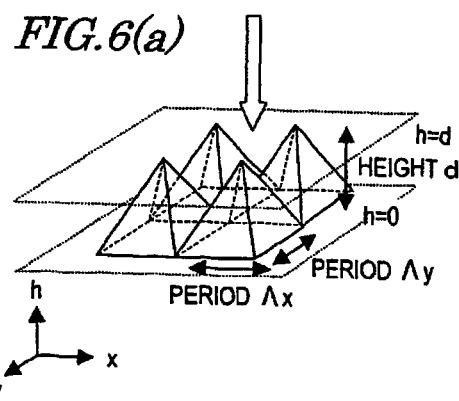
FIGS. 6(a) through 6(e) are perspective views schematically illustrating the configurations of Structures A through E of an antireflective member according to a third specific preferred embodiment.
Figure 6B:
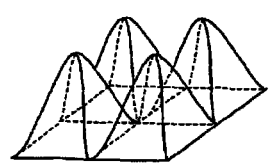
Figure 6C:
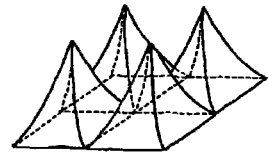
Figure 6D:
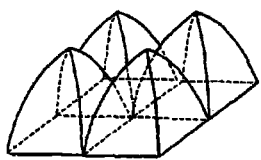
Figure 6E:
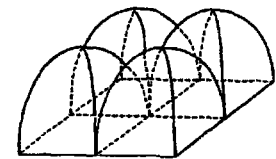

Examples of uneven surface shapes that satisfy Equation (3) include triangular pyramid, quadrangular pyramid, pentagonal pyramid, hexagonal pyramid and other polygonal pyramids. A polygonal pyramid consists of a polygonal bottom surface and a number of side surfaces that are formed by connecting a point outside of the bottom surface (i.e., the vertex) to the bottom surface. Depending on the shape of the bottom surface, the pyramid is called a "triangular pyramid", a "quadrangular pyramid" and so forth. The shapes of the side surfaces are not particularly limited. For example, the side surfaces may have a polygonal shape such as the triangular side surfaces shown in FIG. 6(a) or non-polygonal shapes such as those shown in FIGS. 6(b) through 6(e).

As disclosed in Patent Documents Nos. 3, 4 and 5 cited above, it was believed that to increase the antireflection effects, the uneven surface pattern should have a conical cross section or a pyramidal cross section such as a quadrangular pyramidal cross section and that any of those shapes, including the cone and the quadrangular pyramid, would achieve similar effects. However, the present inventors discovered that the cone was not sufficiently effective, but a polygonal pyramid such as the quadrangular pyramid should be adopted, to minimize the production of zero-order reflected diffracted light, thus acquiring the basic idea of the present invention. That is to say, the cone does not satisfy $n_{eff}(h=0) \approx ns$ in Equation (3).

Hereinafter, it will be described in detail with reference to FIGS. 5(a) through 5(d) how the antireflective member of this preferred embodiment minimizes the regular reflection. More specifically, the present inventors compared the effective refractive indices and the zero-order reflection diffraction efficiencies of an antireflective member with a quadrangular pyramidal uneven surface pattern (i.e., an example that satisfies Equation (3)) and an antireflective member with a conical uneven surface pattern (i.e., an example that fails to satisfy Equation (3)).

FIG. 5(a) is a perspective view schematically illustrating a configuration for an antireflective member including conical structures on the surface of a substrate (not shown). FIG. 5(b) is a perspective view schematically illustrating a configuration for an antireflective member including quadrangular pyramidal structures on the surface of a substrate (not shown, either). The uneven surface patterns of the antireflective members shown in FIGS. 5(a) and 5(b) have mutually different shapes but have the same period and the same height. Specifically, in each of these antireflective members, an uneven surface pattern, in which the period Λx in the x direction is 200 nm, the period Λy in the y direction is 200 nm, and the maximum height of the unevenness is d, has been formed. Both of these antireflective members have a refractive index ns of 1.5.

The present inventors figured out the effective refractive indices $n_{eff}(h)$ and the zero-order reflection diffraction efficiencies (i.e., the regular reflectances) in a situation where visible radiation with a wavelength λ of 550 nm was incident from the air (with a refractive index ni of 1.0) perpendicularly onto these antireflective members (i.e., at an angle of incidence θi of zero degrees).

More specifically, the present inventors calculated the effective refractive indices $n_{eff}(h)$, represented as a function of h, in the range where the height of the unevenness was from zero (i.e., (h/d) 0) to d (i.e., (h/d)=1.0) following the P. Lalanne's method mentioned above. The zero-order reflection diffraction efficiencies were calculated in the range where the height of the unevenness d/λ, which is represented as a ratio to the wavelength λ of the incoming light, was from 0.4 to 1.8, by carrying out diffraction efficiency simulations following the vector diffraction theory mentioned above. The effective refractive indices and zero-order reflection diffraction efficiencies calculated in this manner are shown in FIGS. 5(c) and 5(d), respectively.

As can be seen from FIG. 5(d), the regular reflection can be reduced more significantly by forming a quadrangular pyramidal uneven surface pattern (as plotted by the solid squares ■ in FIG. 5(d)) than by forming a conical uneven surface pattern (as plotted by open circles ○ in FIG. 5(d)). With the conical structures, even if the height of the unevenness, represented by d/h (which will be sometimes referred to herein as a "standardized height"), was increased, the zero-order reflected diffracted light could not be eliminated completely. On the other hand, when the quadrangular pyramidal structures were adopted, the zero-order reflected diffracted light could be virtually eliminated by controlling the standardized height to approximately 1.8. Since λ is set at 550 nm, the height d of the unevenness may be controlled to around 990 nm in order to eliminate the zero-order reflected diffracted light almost completely.

The regular reflection can be reduced more significantly in this manner by forming a quadrangular pyramidal uneven surface pattern, not the conical one, because the cones do not satisfy Equation (3) but the quadrangular pyramids do satisfy Equation (3) about the effective refractive index $n_{eff}(h=0)$. As shown in FIG. 5(c), $n_{eff}((h/d)=1.0)$ is almost equal to ni no matter whether the uneven surface pattern is conical or quadrangular pyramidal. However, $n_{eff}(h=0)$ of the quadrangular pyramids is equal to ns (1.5) as plotted by the solid squares ■ in FIG. 5(c) while $n_{eff}(h=0)$ of the cones is approximately 1.4, which is smaller than ns as plotted by the open circles ○ in FIG. 5(c). As for the quadrangular pyramids, since there are only quadrangular pyramids on the xy plane where h=0, $n_{eff}(h=0)$ agrees with the refractive index ns of the quadrangular pyramids. As for the cones, on the other hand, there are cones and the incidence medium on the xy plane where h=0 and $n_{eff}(h=0)$ is determined by the area ratio of the cones to the incidence medium on the xy plane. Consequently, $n_{eff}(h=0)$ becomes smaller than ns.

Thus, it can be seen that it is important to satisfy $n_{eff}(h=0) \approx ns$ to reduce the zero-order reflected diffracted light drastically. Also, if $n_{eff}(h=d) \approx ns$ is satisfied, then the reflectance can be reduced.

Embodiment 3

Hereinafter, a third specific preferred embodiment of an antireflective member will be described. The antireflective member of this preferred embodiment is a variation of the antireflective member of the second preferred embodiment that satisfies Equation (3). And the effective refractive index $n_{eff}(h)$ has at least one intersection with a function $N_{eff}(h)$ given by the following Equation (5):

$$N_{eff}(h) = \{(n_{eff}(h=0) - n_{eff}(h=d))/d\} \times h + n_{eff}(h=0) \quad (5)$$

and further satisfies the following Inequality (6):

$$|N_{eff}(h) - n_{eff}(h)| \leq |n_{eff}(h=d) - n_{eff}(h=0)| \times 0.2 \quad (6)$$

According to this preferred embodiment, even if the standardized height given by d/λ is even lower than the antireflective member of the second preferred embodiment described above, the regular reflectance can still be reduced to 0.1% or less.

This preferred embodiment requires that the effective refractive index $n_{eff}(h)$ of the uneven surface shape, represented as a function of the height h of unevenness, has at least one intersection with the function $N_{eff}(h)$ given by Equation (5) in which the gradient is constant all through the unevenness height range of 0 through d. Furthermore, the (absolute value of the) difference between the function $N_{eff}(h)$ and the effective refractive index $n_{eff}(h)$ is within 20% of the (absolute value of the) difference between the refractive index of the substrate medium and that of the incidence medium. The present inventors discovered that these requirements should be satisfied to reduce the regular reflection sufficiently, thus acquiring the basic idea of the present invention.

Hereinafter, it will be described in detail with reference to FIGS. 6(a) through 6(e) and FIGS. 7(a) through 7(c) how effectively the antireflective member of this preferred embodiment can reduce the regular reflection. Specifically, the present inventors compared the effective refractive indices and zero-order reflection diffraction efficiencies of the quadrangular pyramids of various shapes shown in FIGS. 6(a) through 6(e). In the following description, the antireflective members shown in FIGS. 6(a) through 6(e) will be referred to herein as Structures A through E, respectively. Among these structures, Structure A has the same shape as the quadrangular pyramids shown in FIG. 5(b).

FIG. 7(b) shows the projections of the uneven surface patterns of Structures A through E onto an xh plane. The refractive indices and uneven surface pattern periods of these structures are the same as those of the structure shown in FIG. 5(b).

The effective refractive indices $n_{eff}(h)$ and the zero-order reflection diffraction efficiencies of these structures in response to perpendicularly incident light were calculated as in the second preferred embodiment described above. The effective refractive indices and the zero-order reflection diffraction efficiencies are shown in FIGS. 7(a) and 7(c), respectively.

As can be seen from FIG. 7(c), Structure D (as plotted by the solid diamonds ♦ in FIG. 7(c)) could reduce the regular reflection more significantly than any other Structure A, B, C or E. As can be seen from FIG. 7(a), Structure D satisfies the requirements defined by this preferred embodiment. In Structure D, the effective refractive index $n_{eff}(h)$ intersects with the function $N_{eff}(h)$ at the three points where h≈0, h≈d/2 and h≈d, respectively. Although Structure D has these three intersections between the effective refractive index $n_{eff}(h)$ and the function $N_{eff}(h)$, the intersection may be at least one of these three points.

More specifically, in Structure D, the distribution of effective refractive indices in the range where (h/d)=0 to 0.5 is substantially symmetrical to that in the range where (h/d)=0.5 to 1.0 with respect to the inflection point where (h/d)=0.5. Unlike Structures B and C to be described later, Structure D has no range where the rate of variation in effective refractive index changes steeply. Specifically, in Structure D, there are ranges with relatively low rates of variation (i.e., gentle gradient of the tangent) in effective refractive index in the vicinities of (h/d)≈0 and (h/d)≈1.

When Structure D was adopted, the zero-order reflected diffracted light could be eliminated almost completely by controlling d/λ to approximately 1.2 or more (preferably approximately 1.4 or more). Since λ is set at 550 nm, the zero-order reflected diffracted light can be virtually eliminated by controlling the height d of unevenness within the range of about 660 nm (i.e., in a situation where d/λ=1.2) to about 770 nm (i.e., in a situation where d/λ=1.4). Consequently, by adopting Structure D for the uneven surface pattern, the regular reflection can be further reduced even if the standardized height, represented by d/λ, is smaller than that of the antireflective member of the second preferred embodiment described above.

The other Structures A, B, C and E are comparative examples that do not satisfy the requirements of this preferred embodiment (see FIG. 7(a)). Each of these structures has a range in which the rate of variation in effective refractive index changes steeply somewhere in the unevenness height (h/d) range of 0 to d, thus reducing the regular reflection less effectively than Structure D. Hereinafter, it will be described one by one how much these structures can reduce the regular reflection.

First, look at the distribution of effective refractive indices in Structure A as plotted by the open squares □ in FIG. 7(a). In Structure A, the rate of variation in effective refractive index is somewhat smaller in the range where (h/d)≈0.6 to 1.0 than in the range where (h/d)≈0 to 0.6. In such a range where the effective refractive index does not vary so much with the variation in the height of unevenness, the zero-order reflection diffraction efficiency becomes zero while oscillating with the height d/λ of unevenness as shown in FIG. 7(c). In the range where the diffraction efficiency attenuates while oscillating, interference phenomenon just like that observed on a single-layer thin film would be present. In that case, to realize good antireflection function over a broad wavelength range, the standardized height d/λ must be increased, thus decreasing the accuracy of transfer from the mold.

Next, look at the distributions of effective refractive indices in Structures C and E as plotted by the open triangles Δ and the asterisks *, respectively, in FIG. 7(a). In Structures C and E, the rate of variation in effective refractive index increases steeply in the vicinity of (h/d)≈0 (in Structure C) and in the vicinity of (h/d)≈1 (in Structure E). When there is such a range where the refractive index changes steeply with the variation in the height of unevenness, the zero-order reflection diffraction efficiency does not become zero even if the standardized height d/λ is increased as can be seen from FIG. 7(c). In such a range, there would be a diffraction phenomenon similar to that observed in a structure that has an interface with a discontinuous distribution of effective refractive indices. Thus, the regular reflection cannot be reduced sufficiently.

Structure B has both a range where the rate of variation in effective refractive index is relatively high (in the vicinity of (h/d)≈0) and a range where the rate of variation in effective refractive index is relatively low (where (h/d)≈0.2 to 1.0) as plotted by the open circles ○ in FIG. 7(a). That is why the regular reflectance of Structure B decreases while oscillating with the standardized height as shown in FIG. 7(c) but does not become zero even if the height of unevenness is increased.

Taking these results into account, it can be seen that to realize the antireflection function (i.e., to reduce the regular reflection sufficiently) in a broad wavelength range, the quadrangular pyramidal structure that satisfies the requirements of this preferred embodiment is preferably adopted.

Embodiment 4

Hereinafter, a fourth specific preferred embodiment of an antireflective member will be described. The antireflective member of this preferred embodiment is designed such that each raised portion substantially makes a point contact with an xy plane where h=d and each recessed portion substantially makes a point contact with an xy plane where h=0 in any of the antireflective members of the first, second and third preferred embodiments described above. Preferably, the recessed portions are arranged symmetrically to the raised portions with respect to an xy plane where h=d/2. According to this preferred embodiment, even when made by a transfer process, either an antireflective member that satisfies not only Equation (3) but also the requirements defined by the third preferred embodiment described above or an antireflective member that satisfies both Equation (3) and the following Equation (4) can be obtained:

$$dn_{eff}(h)/dh \approx \{(n_{eff}(h=0) - n_{eff}(h=d))/d\} \quad (4),$$

The meaning of this Equation (4) will be described briefly. Specifically, Equation (4) means that the differential coefficient (i.e., the gradient of the tangent) of the effective refractive index represented by the left side substantially agrees with the average of the effective refractive indices represented by the right side. In other words, Equation (4) means that the ratio $\Delta n_{eff}/\Delta h$ of the variation $\Delta n_{eff}$ in effective refractive index to the variation $\Delta h$ in unevenness height is substantially constant all through the unevenness height range of 0 through d.

As used herein, "if Equation (4) is satisfied", then the differential coefficient of the effective refractive index (on the left side) is within ±20% of the average of the effective refractive indices (on the right side).

According to this preferred embodiment, this requirement is defined in order to form an uneven surface pattern that realizes excellent antireflection function with high precision even by a transfer process. As described above, an uneven surface pattern is usually formed by a transfer process using a mold. However, an uneven surface pattern (antireflective member) formed by a transfer process often has recessed portions with a rounded bottom and/or raised portions with a rounded top. For example, if the antireflective member has Structure B or Structure C described above, the rate of variation in the effective refractive index of the antireflective member increases steeply in the vicinity of (h/d)≈0 and the regular reflection reducing function might decline significantly. Thus, there is a high demand for an antireflective member in which the distribution of effective refractive indices of the uneven surface pattern satisfies not only Equation (3) but also the requirement of the third preferred embodiment or Equation (4) even when made by a transfer process.

Figure 8A:
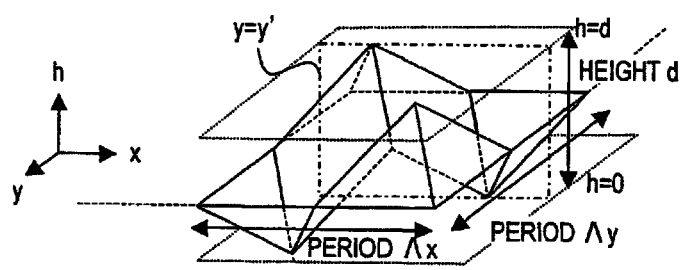
FIGS. 8(a) through 8(c) are perspective views schematically illustrating the configurations of Structures A through H of an antireflective member according to a fourth specific preferred embodiment.
Figure 8B:
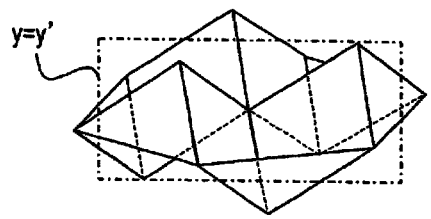
Figure 8C:
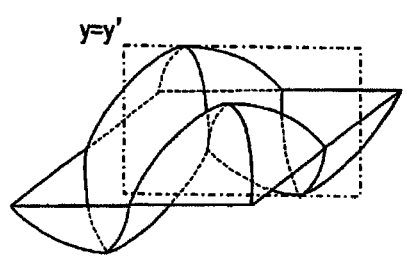

Hereinafter, it will be described in detail with reference to FIGS. 8(a) through 8(c) and FIGS. 9(a) through 9(c) exactly how the antireflective member of this preferred embodiment reduces the regular reflection. Specifically, the present inventors compared the effective refractive indices and zero-order reflection diffraction efficiencies of the antireflective members with the uneven surface shapes shown in FIGS. 8(a), 8(b) and 8(c) with each other. FIGS. 8(a), 8(b) and 8(c) illustrate an uneven surface-structure corresponding to one period of the uneven surface pattern of each antireflective member. Also, in FIGS. 8(a) through 8(c), the y=y' plane is one of the planes which is parallel to the xh plane and which includes y=y'. In the following description, the antireflective members shown in FIGS. 8(a), 8(b) and 8(c) will be referred to herein as Structures F, G and H, respectively.

Figure 9A:
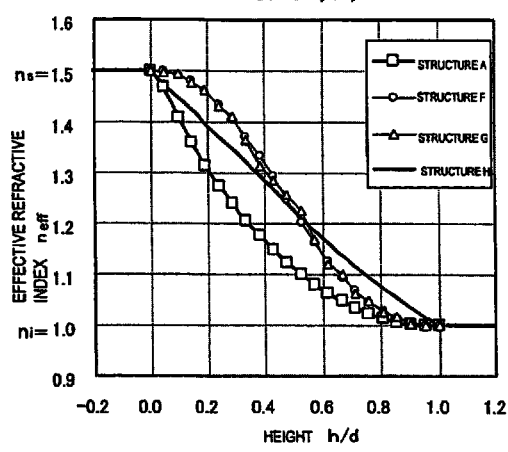
FIG. 9(a) is a graph showing how the effective refractive index $n_{eff}(h)$ changes with the height h/d of the unevenness in Structures F through H.
Figure 9B:
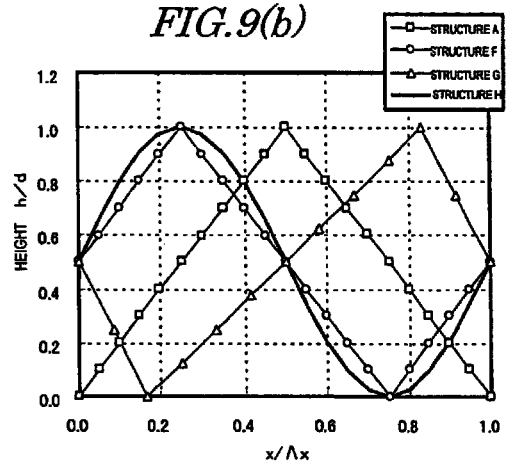
FIG. 9(b) is a cross-sectional view of the structures shown in FIGS. 8(a) through 8(c) as viewed on the y=y' plane.

FIG. 9(b) is a cross-sectional view of the structures shown in FIGS. 8(a) through 8(c) as viewed on the y=y' plane. The projection of Structure A is also shown in FIG. 9(b) for reference. The uneven surface pattern periods Λx and Λy and the refractive index of Structures F, G and H are Λx=Λy=200 nm and ns=1.5, respectively, as in Structure A, which is a quadrangular pyramid with a square bottom and triangular side surfaces. In each of Structures F, G and H, the recessed portions are arranged symmetrically to the raised portions with respect to the xy plane where h=d/2.

Figure 10A:
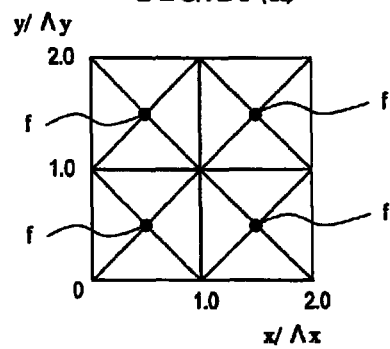
FIG. 10(a) is a plan view of a raised portion in the uneven surface pattern of Structure A shown in FIG. 6(b) as viewed from over the top of the raised portion.
Figure 10B:
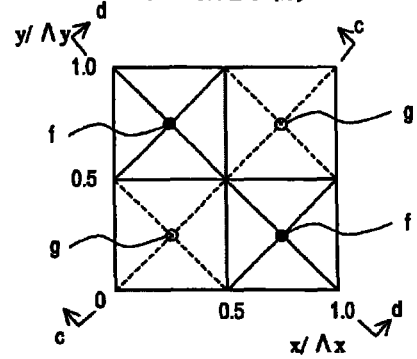
FIG. 10(b) is a plan view of a raised portion in the uneven surface pattern of Structure F shown in FIG. 8(a) as viewed from over the top of the raised portion.
Figure 10C:
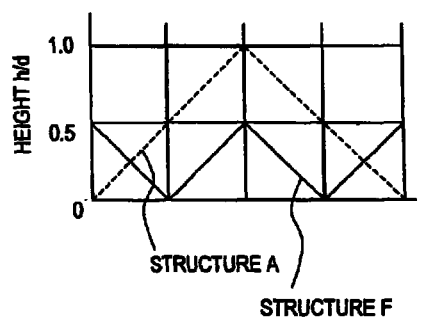
FIG. 10(c) is a cross-sectional view of the raised portion shown in FIG. 10(b) as viewed on the c-c plane.
Figure 10D:
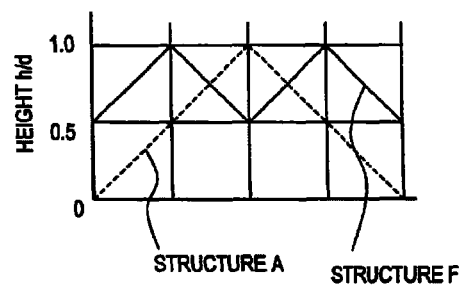
FIG. 10(d) is a cross-sectional view of the raised portion shown in FIG. 10(b) as viewed on the d-d plane.
Figure 11A:
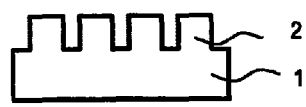
FIG. 11(a) is a cross-sectional view schematically illustrating a substrate with a rectangular unevenness.
Figure 11B:
FIG. 11(b) is a cross-sectional view schematically illustrating a substrate with a triangular unevenness.
Figure 12:
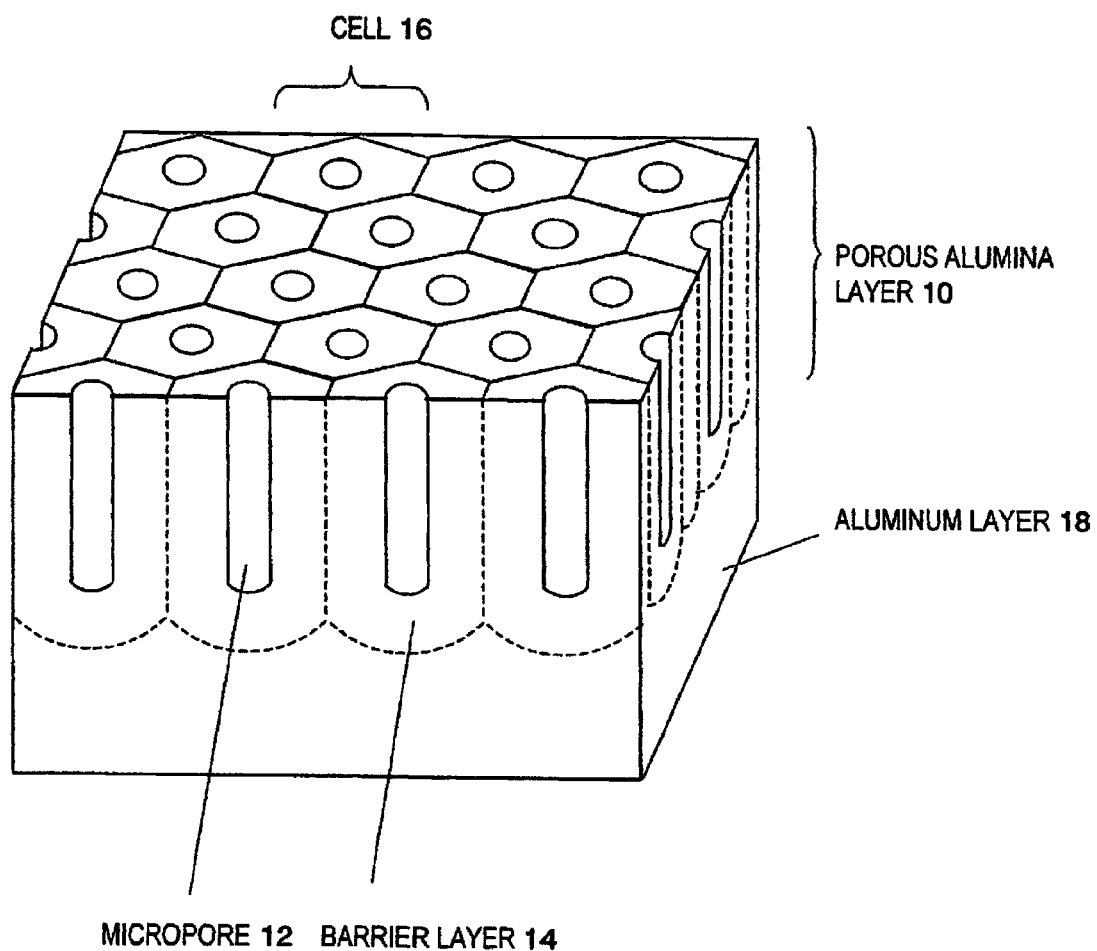
FIG. 12 is a perspective view schematically illustrating the structure of a porous alumina layer.

To make the difference between the uneven surface patterns of Structure A and F understandable more clearly, FIGS. 10(a) and 10(b) show plan views of Structures A and F as viewed from over the top of the unevenness. Specifically, FIG. 10(a) is a plan view of a raised portion in the uneven surface pattern of Structure A shown in FIG. 6(b) as viewed from over the top of the raised portion. FIG. 10(b) is a plan view of a raised portion in the uneven surface pattern of Structure F shown in FIG. 8(a) as viewed from over the top of the raised portion. FIG. 10(c) is a cross-sectional view of the raised portion of Structure F shown in FIG. 10(b) as viewed on the c-c plane and FIG. 10(d) is a cross-sectional view of the raised portion shown in FIG. 10(b) as viewed on the d-d plane. Cross-sectional views of Structure A, which was made in the same way as Structure F, are also shown in FIGS. 10(c) and 10(d) for reference. As to the uneven surface patterns of Structures G and H, the same drawings as FIGS. 10(b) through 10(d) are also applicable.

In Structure F, the recessed portions are arranged symmetrically to the raised portions with respect to the xy plane where h=d/2, each raised portion has been formed so as to substantially make a point contact with the xy plane where h=d (at the point f), and each recessed portion has been formed so as to substantially make a point contact with the xy plane where h=0 (at the point g) as shown in FIGS. 10(b) through 10(d), thus satisfying the requirements of this preferred embodiment. In Structure A on the other hand, the raised portion substantially makes a point contact with the xy plane where h=d (at the point f) but the recessed portion (bottom) does not satisfy the requirements of this preferred embodiment as shown in FIG. 10(a).

Figure 9C:
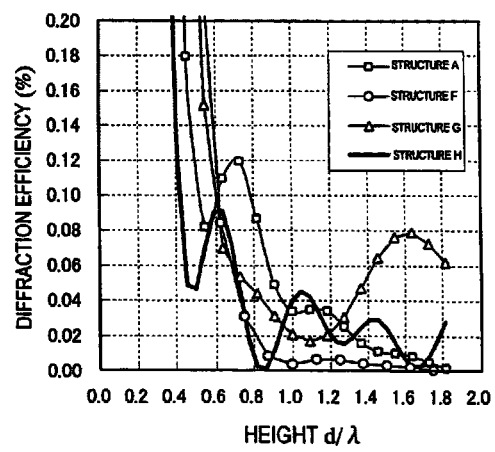
FIG. 9(c) is a graph showing how the zero-order reflection and diffraction efficiency changes with the height d/λ of the unevenness, which is represented as a ratio to the wavelength λ of the incoming light, in Structures F through H.

The effective refractive indices $n_{eff}(h)$ and zero-order reflection diffraction efficiencies of these antireflective members in response to perpendicularly incident light were calculated as in the second preferred embodiment described above. The effective refractive indices and the zero-order reflection diffraction efficiencies are shown in FIGS. 9(a) and 9(c), respectively. The effective refractive index and the zero-order reflection diffraction efficiency of Structure A are also shown in FIGS. 9(a) and 9(c) for reference.

First, Structures F and G will be described. As shown in FIG. 9(a), the distributions of effective refractive indices of Structures F and G satisfy Equation (3) and the requirements of the third preferred embodiment all through the range where (h/d)=0 to 1.0, thus realizing good regular reflection reducing function (see FIG. 9(c)). In FIGS. F and G, the effective refractive index $n_{eff}(h)$ intersects with the function $N_{eff}(h)$ at three points where h=0, h≈d/2 and h≈d, respectively.

More specifically, in Structures F and G, the distribution of effective refractive indices in the range where (h/d)=0 to 0.5 is substantially symmetrical to that in the range where (h/d) =0.5 to 1.0 with respect to the inflection point where (h/d) =0.5. Unlike Structures B and C described above, Structures F and G have no range where the rate of variation in effective refractive index changes steeply. Specifically, in Structures F and G, there are ranges with relatively low rates of variation (i.e., gentle gradient of the tangent) in effective refractive index in the vicinities of (h/d)≈0 and (h/d)≈1.

In Structure H on the other hand, the rate of variation in effective refractive index is constant all through the range where (h/d)=0 to 1.0, thus satisfying Equations (3) and (4). As a result, good regular reflection reducing function is realized (see FIG. 9(c)). Structure H can reduce the regular reflection sufficiently even if the standardized height, represented as d/λ, is even smaller than that of the antireflective member of the second preferred embodiment.

Hereinafter, it will be described with reference to FIGS. 10(a) and 10(b) why the distribution of effective refractive indices hardly changes in Structures F, G and H even if these structures are made by a transfer process. In the following description, structures F and A will be compared with each other for convenience sake.

As described above, the effective refractive index is determined by the area ratio of the uneven shape medium to the incidence medium on the xy plane. In Structure A, only the bottom of Structure A is present on the xy plane where h=0 as shown in FIG. 10(a). That is to say, there will be a network of boundaries between the uneven shape medium and the incidence medium on the xy plane where h=0 and the effective refractive index of h=0 agrees with the refractive index ns of the uneven shape medium. However, if this Structure A is made by a transfer process, frequently these boundaries cannot be accurately reproduced but become two-dimensional areas with finite dimensions, thus increasing the percentage of the area of the incidence medium. As a result, the effective refractive index to be calculated based on the area percentage on the xy plane where h=0 becomes much smaller than ns.

Meanwhile, in Structure F, each recessed portion substantially makes a point contact with the xy plane where h=0 (at the point g) as shown in FIG. 10(b). Even if Structure F is made by a transfer process, the point g, which is the lowest-level point of the recessed portion, will just have a two-dimensional area. Thus, the variation in effective refractive index of h=0 is smaller than the situation where the boundaries expand two-dimensionally.

Consequently, Structure F achieves excellent antireflection function because the distribution of effective refractive indices hardly changes even if Structure F is made by a transfer process.

Next, the regular reflection reducing function of Structures F, G and H will be described more fully with reference to FIG. 9(c). Structure F can reduce the regular reflectance to absolutely zero by setting the unevenness height d/λ approximately equal to 1.8 as plotted by the open circles ○ in FIG. 9(c). On the other hand, Structure H can reduce the regular reflectance to almost zero by setting the unevenness height d/λ in the range of about 0.8 to about 0.9 as plotted by the solid curve in FIG. 9(c). In Structure G, the regular reflectance is always 0.1% or less, which is lower than that of Structure A, in the range where the unevenness height d/λ is about 0.6 to about 1.3, as plotted by the open triangles △ in FIG. 9(c). Thus, Structure G achieves good regular reflection reducing function when the unevenness height is small.

Taking these results into consideration, to achieve the highest possible regular reflection reducing function, Structure F is preferably adopted. On the other hand, to realize good regular reflection reducing function by decreasing the standardized height represented as d/λ, Structure H will be effective. Considering that its mold is easy to make, Structure H is preferred. This is because although Structures F and G have raised and recessed portions with acute tops and bottoms, Structure H has raised and recessed portions with curved tops and bottoms, thus making it easy to make a mold of a desired shape.

In the preferred embodiment described above, to make an uneven surface pattern with good antireflectivity precisely even by a transfer process, the raised and recessed portions are required "to substantially make a point contact with the xy plane where h=d and with the xy plane where h=0, respectively". However, if the unevenness can be formed just as designed, it is not always necessary to satisfy this condition. For example, a structure that does not have recessed portions unlike Structure H but that has the same distribution of effective refractive indices as Structure H exhibits as good antireflectivity as Structure H.

In the examples described above, the uneven surface pattern of the antireflective members has periodicity in the x and y directions. However, the uneven surface pattern does not always have to have two-dimensional periodicity (i.e., on the xy plane).

Rather, the same effects are achieved if the following Inequalities (1') and (2'), obtained by substituting P (which is the gap between two arbitrary adjacent raised portions or recessed portions) for either the period Λx or the period Λy in Inequalities (1) and (2), are satisfied. It should be noted that to minimize the diffraction in the entire wavelength range of visible radiation (i.e., from 380 nm to 780 nm), the gap P between two adjacent raised portions or recessed portions preferably falls within the range of 100 nm to 200 nm.

$$\frac{P}{\lambda_{min}} < \frac{1}{ni + ni \cdot \sin\theta i_{max}} \quad (1')$$

$$\frac{P}{\lambda_{min}} < \frac{1}{\max\{ni, ns\} + ni \cdot \sin\theta i_{max}} \quad (2')$$

Also, the relations such as those defined by Equations (3) through (6) about the effective refractive index $n_{eff}(h)$, which is represented as a function of h that is the axis of coordinates in the height direction of the uneven surface pattern, have nothing to do with whether the uneven surface pattern has two-dimensional periodicity or not. Thus, the foregoing statement applies as it is.

The antireflective member described above may be made by a transfer process using a stamper, for example. Particularly if a method of making anodized porous alumina to be described below is adopted, a stamper with a large area can be made relatively easily. In the following example, a method of making a plurality of very small recessed portions, each having stepped side surfaces, will be described. Alternatively, recessed portions with smooth side surfaces may also be formed.

Hereinafter, a method of making a stamper according to a preferred embodiment will be described.

The present inventors looked for a method of making a stamper, which can also be used effectively to make a stamper with a huge area or with a special shape, by utilizing the process of forming anodized porous alumina. Anodized alumina may be formed by a wet process. That is why a base including an aluminum layer has only to be immersed in an electrolytic solution or an etching solution and no vacuum process has to be carried out. Thus, this process is hardly subject to equipment size and other constraints. Also, since this process is hardly affected by the shape of the base as long as the base can be immersed in an electrolytic solution or an etching solution, a stamper of a special shape such as a roller can be made, too.

However, if anodized porous alumina were wet-etched, then alumina micropores would be etched isotropically entirely (i.e., not only the cell wall but also the barrier layer as well), thus making it difficult to control the uneven surface shape. For example, it should be difficult to form a fine uneven structure of a desired shape on the surface of an antireflective film.

That is why to control the uneven surface shape, some process for forming an anisotropic shape needs to be carried out. Thus, the present inventors paid special attention to the phenomenon that the micropores (i.e., very small recessed portions) of anodized porous alumina are formed perpendicularly to the substrate. That is to say, this micropore forming process itself has great anisotropy. In addition, the anodized porous alumina is characterized in that if an anodization process is once stopped and then resumed again under the same conditions, a micropore of the same cell size and the same pore diameter will be formed again at the same location (i.e., from the bottom of a micropore, formed in the previous process, as a start point). If a method of making a stamper according to the present invention is adopted, a stamper to make an antireflective member, of which the surface has a fine uneven structure that guarantees a high antireflectivity, can be made by taking advantage of these features.

A method of making a stamper according to a preferred embodiment is designed to make a stamper that has a fine uneven surface structure. The method includes the steps of: (a) providing a base, of which the surface has an aluminum layer including at least 95 mass % of aluminum; (b) anodizing the aluminum layer partially, thereby forming a porous alumina layer with a plurality of very small recessed portions; and (c) bringing the porous alumina layer into contact with an alumina etchant to expand the very small recessed portions of the porous alumina layer. A plurality of very small recessed portions, each having a stepped side surface, are formed on the porous alumina layer by alternately and repeatedly performing the steps (b) and (c) a number of times.

A method of making a stamper according to this preferred embodiment is partly characterized by forming a plurality of very small recessed portions with a stepped side surface. Non-Patent Document No. 1 disclosed just recently that anodized alumina with various shapes could be formed by repeatedly performing the process step of anodizing aluminum and the process step of expanding the diameter. Also, according to Non-Patent Document No. 1, an antireflective member with a motheye structure could be made by a PMMA process using alumina with non-bell-shaped tapered micropores as a mold, and had a reflectance of approximately 1% or less. However, the alumina layer disclosed in Non-Patent Document No. 1 has recessed portions with smooth (or continuous) and straight side surfaces.

On the other hand, a stamper according to a preferred embodiment has very small recessed portions with a stepped side surface, and therefore, has a broad specific surface. As a result, a surface treatment will be very effective. For example, if the surface of the stamper is subjected to a mold release process, then the transferability thereof will improve. Also, if the surface of the antireflective member is subjected to a water and oil repellent treatment (e.g., fluorine treatment), the soil resistance thereof will increase. Furthermore, an antireflective member obtained by using this stamper has very small raised portions with a stepped side surface, and therefore, produces reflection (or zero-order diffraction) of light less easily than an antireflective member with the same pitch and the same height.

As used herein, the uneven shape on the surface of a stamper refers to a shape that is characterized by the arrangement period of a plurality of recessed portions on the uneven surface structure and the depth, opening area, and aspect ratio (i.e., the ratio of the depth of the opening to the size thereof) of the recessed portions. When approximated into a circle of the same area, the opening of a recessed portion may have its size represented by the diameter of the circle. In the same way, the uneven shape on the surface of an antireflective member that is formed by transferring the surface shape of a stamper refers to a shape that is characterized by the arrangement period of a plurality of raised portions on the uneven surface structure and the height, bottom area, and aspect ratio (i.e., the ratio of the height to the bottom size) of the raised portions. When approximated into a circle of the same area, the bottom of a raised portion may have its size represented by the diameter of the circle. The shape of the uneven surface structure is represented in this manner because it is these recessed portions (or the raised portions of the antireflective member to which the shape of the recessed portions of the stamper has been transferred) that are directly controlled in the process of making a stamper using anodized alumina.

Figure 13:
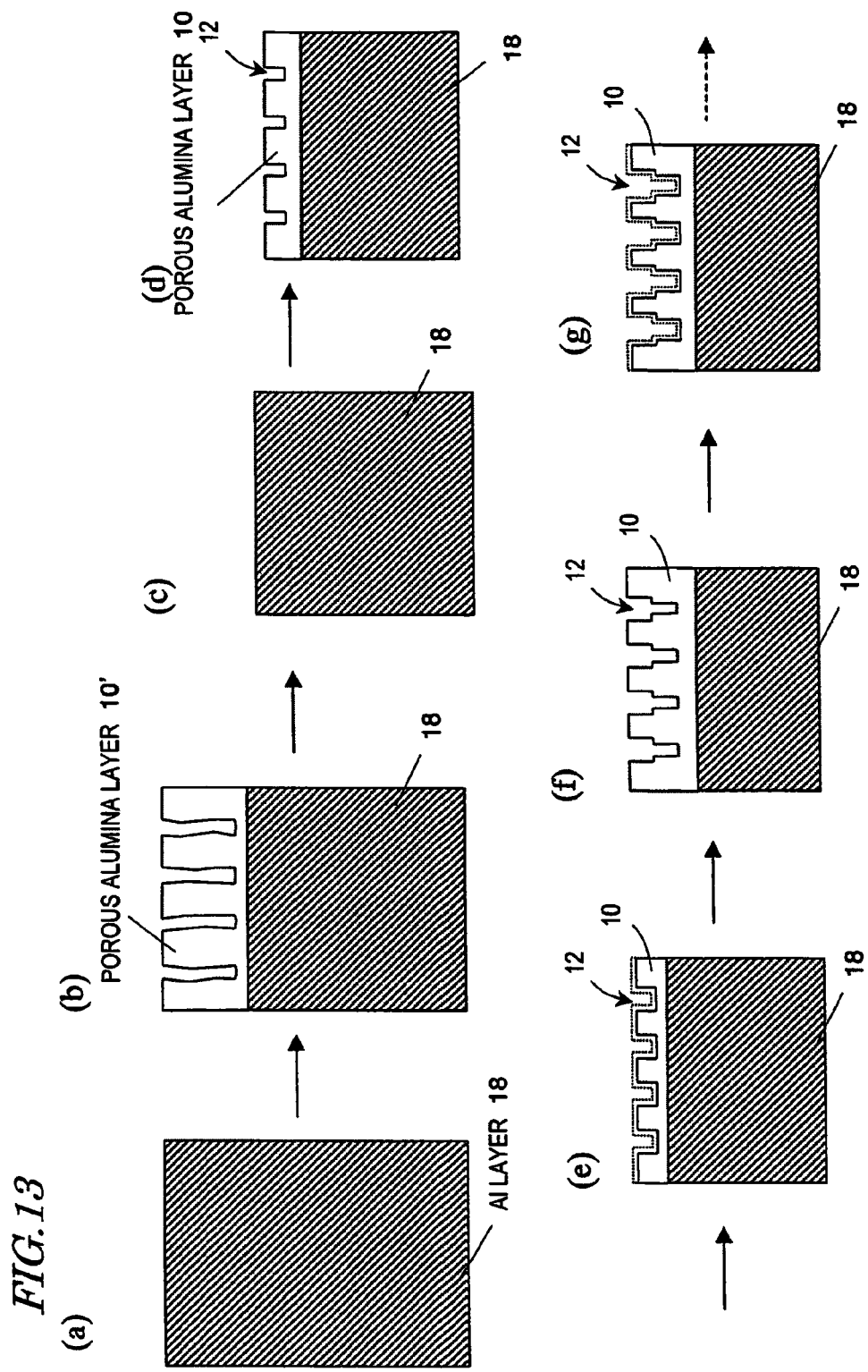
FIGS. 13(a) through 13(g) are cross-sectional views schematically illustrating how to make a stamper according to a preferred embodiment.

Hereinafter, a method of making a stamper according to a preferred embodiment will be described with reference to FIG. 13.

First, as shown in FIG. 13(a), a base including an aluminum (Al) layer 18 on its surface is provided. In FIG. 13(a), only the aluminum layer 18 is illustrated for the sake of simplicity. Also, if an electrically insulating material (such as glass) is used as the base, either an electrical conductive metal layer or a semiconductor layer is preferably deposited as an undercoat film for the aluminum layer 18 in order to make the micropores (i.e., very small recessed portions) uniformly by an anodization process. A valve metal is preferably used as the electrically conductive metal. As used herein, the "valve metal" is a generic term of various anodizable metals, which include not only aluminum but also tantalum (Ta), niobium (Nb), molybdenum (Mo), titanium (Ti), hafnium (Hf), zirconium (Zr), zinc (Zn), tungsten (W), bismuth (Bi) and antimony (Sb). Among other things, tantalum (Ta), niobium (Nb), molybdenum (Mo), titanium (Ti) and tungsten (W) are preferred. As the semiconductor, silicon (Si) is preferred. Even when contacting with an electrolytic solution during the anodization process, a valve metal and a semiconductor such as Si never create bubbles and can contribute to forming an oxidized film with good stability without peeling off or causing breakdown.

In the following example, the Al layer 18 is supposed to include 99.99 mass % or more of aluminum. However, as disclosed in Patent Document No. 6, for example, the Al layer 18 may include other elements. In that case, the Al layer 18 preferably includes 1 mass % to less than 5 mass % of Ti and/or Si. Since Si and Ti hardly form a solid solution in Al, these elements serve so as to retard the growth of Al crystal grains when the Al layer 18 is formed by an evaporation process, for example. As a result, an Al layer 18 with a flat surface can be obtained. Also, instead of forming the Al layer 18 by a known process such as an evaporation process or a molten aluminum plating process, the base itself may be made of bulk aluminum.

The surface of the Al layer 18 is preferably planarized in advance, e.g., by an electric field polishing process using a mixture of perchloric acid and ethanol. This is because the surface planarity of the Al layer 18 will have influence on how micropores are formed in the anodized porous alumina.

Next, as shown in FIG. 13(b), this Al layer 18 is anodized partially (i.e., only in its surface region) under predetermined conditions, thereby forming a porous alumina layer 10'. By adjusting the conditions of the anodization process (including a forming voltage, the type and concentration of the electrolytic solution, and the anodization process time), the size, density and depth of the resultant micropores can be controlled. Also, the regularity of the arrangement of micropores can also be controlled by changing the magnitudes of the forming voltage. For example, the conditions for realizing an arrangement with a high degree of regularity include performing an anodization process (1) at a proper constant voltage that is uniquely defined for each electrolytic solution and (2) for a sufficiently long time. It is known that proper electrolytic solution and forming voltage combinations include sulfuric acid at 28 V, oxalic acid at 40 V and phosphoric acid at 195 V.

In the porous alumina layer 10' produced at this initial stage, the arrangement of micropores tends to be irregular. Thus, in view of the reproducibility, the porous alumina layer 10' initially formed is preferably removed as shown in FIG. 13(c). Also, the porous alumina layer 10' preferably has a thickness of at least 200 nm considering its reproducibility but at most 2,000 nm from the standpoint of productivity.

Naturally, the process steps (e) through (g) to be described later and the remaining process steps may also be performed without removing the porous alumina layer 10' if necessary. Also, although FIG. 13(c) illustrates an example in which the porous alumina layer 10' has been removed completely, the porous alumina layer 10' may also be removed only partially (e.g., to a certain depth as measured from its surface). The porous alumina layer 10' may be removed by immersing the porous alumina layer 10' in an aqueous solution of phosphoric acid or in a mixture of chromium and phosphoric acid for a predetermined amount of time or by any other known method.

Thereafter, as shown in FIG. 13(d), an anodization process is performed all over again, thereby forming a porous alumina layer 10 with micropores 12. In this process step, by adjusting the conditions and process time of the anodization, the size, density, depth and arrangement regularity of the micropores are controlled.

Subsequently, as shown in FIG. 13(e), the porous alumina layer 10 with the micropores 12 is brought into contact with an alumina etchant, thereby etching the micropores to a predetermined depth and increasing the diameter of the micropores 12. By adopting wet etching in this process step, the wall and barrier layer of the micropores can be expanded substantially isotropically. Also, by changing the types and concentrations of the etchant and adjusting the etching process time, the etch rate (corresponding to the size and depth of the micropores 12) can be controlled. For example, the micropores 12 may be deepened by immersing the porous alumina layer 10 in an aqueous solution of phosphoric acid or in a mixture of chromium and phosphoric acid for a predetermined amount of time.

Thereafter, as shown in FIG. 13(f), the Al layer 18 is partially anodized again, thereby growing the micropores 12 in the depth direction and thickening the porous alumina layer 10 at the same time. In this process step, the micropores 12 start to grow from the bottom of the preexistent micropores 12. Consequently, the resultant micropores 12 will have a stepped side surface.

After that, as shown in FIG. 13(g), the porous alumina layer 10 is bought into contact with the alumina etchant again, thereby etching the porous alumina layer 10 even deeper and further expanding the diameter of the micropores 12.

By repeatedly performing the anodization process step shown in FIG. 13(d) and the etching process step shown in FIG. 13(e) over and over again in this manner, a porous alumina layer 10 with a desired uneven surface shape (i.e., very small recessed portions) 12 can be obtained. If the process conditions of the anodization and etching process steps are appropriately set, not only the size, density and depth of the micropores 12 but also the stepped side surface shape of the micropores 12 can be controlled. To reduce the bottom size of the micropores 12, the process preferably ends with the anodization process step (with the subsequent etching process step omitted).

In this example, the anodization process step and the etching process step are supposed to be performed alternately. Optionally, a cleaning process step may be interposed between the anodization process step and the etching process step or between the etching process step and the anodization process and a drying process step may be performed after the anodization or etching process step.

A method of making a stamper according to this preferred embodiment can be used effectively to make an antireflective member with a motheye structure, for example. Hereinafter, the uneven surface shape of an antireflective member that ensures good antireflectivity will be described.

As already described for the first through fourth preferred embodiments, the antireflectivity of an antireflective member with an uneven surface structure depends on the uneven surface shape. Also, the continuity of variation in effective refractive index at the interface between the incidence medium (such as the air) and the uneven surface structure and at the interface between the uneven surface structure and the base and the height (or the aspect ratio) of the unevenness have significant effects on the resultant antireflectivity. The interface between the incidence medium and the uneven surface structure and the interface between the uneven surface structure and the base are ideally a point and the area of contact is preferably as small as possible. Furthermore, the uneven surface shape itself (i.e., the distribution of effective refractive indices in the uneven surface structure) has direct effects on the resultant antireflectivity.

It should be noted that to minimize the production of diffracted light, the arrangement of recessed portions or raised portions in the uneven surface structure preferably has no periodicity. If the sum of vectors from the centroid of a micropore to the respective centroids of all micropores that are adjacent to the former micropore is 5% or more of the overall length of the vectors, then the arrangement may be regarded as having substantially no periodicity. Also, if the uneven surface structure has some periodicity, then the period is preferably shorter than the wavelength of light. Furthermore, the gap between two adjacent recessed portions (or the gap between two adjacent raised portions in the antireflective member) preferably falls within the range of 100 nm to 200 nm in order to minimize the diffraction in the entire wavelength range of visible radiation.

That is why as for a stamper to make such an antireflective member, either the inversion of the desired uneven surface shape that guarantees high antireflectivity or the surface shape itself may be formed on the surface of the base with the respective factors contributing to the antireflection controlled.

If the desired uneven surface shape itself that guarantees high antireflectivity has been formed on the surface of the base, then a metallic stamper (e.g., a Ni stamper), on which the uneven surface shape of the alumina layer has been transferred by an electroforming process, for example, may be prepared and then an antireflective member may be formed by a transfer process using such a stamper. The Ni electroformed stamper may be appropriately made by an electroplating process, an electroless plating process or any other known technique. On the other hand, if the inversion of the desired uneven surface shape that guarantees high antireflectivity has been formed on the surface of the base, then the base with such a surface shape may be used as it is as a stamper to make an antireflective member. If the mechanical strength of the base is not high enough to use it as a stamper as it is, then a layer of a high-hardness material such as Ni or W may be deposited on the surface with the uneven surface shape.

Naturally, a metallic stamper having the same surface structure as the uneven surface structure of the alumina layer may be formed by transferring the transferred uneven surface structure of the alumina layer again.

Hereinafter, various shapes of the micropores (or very small recessed portions) 12 of the porous alumina layer 10 formed by the method of making a stamper according to this preferred embodiment will be described with reference to FIGS. 14 through 18.

Figure 14A:
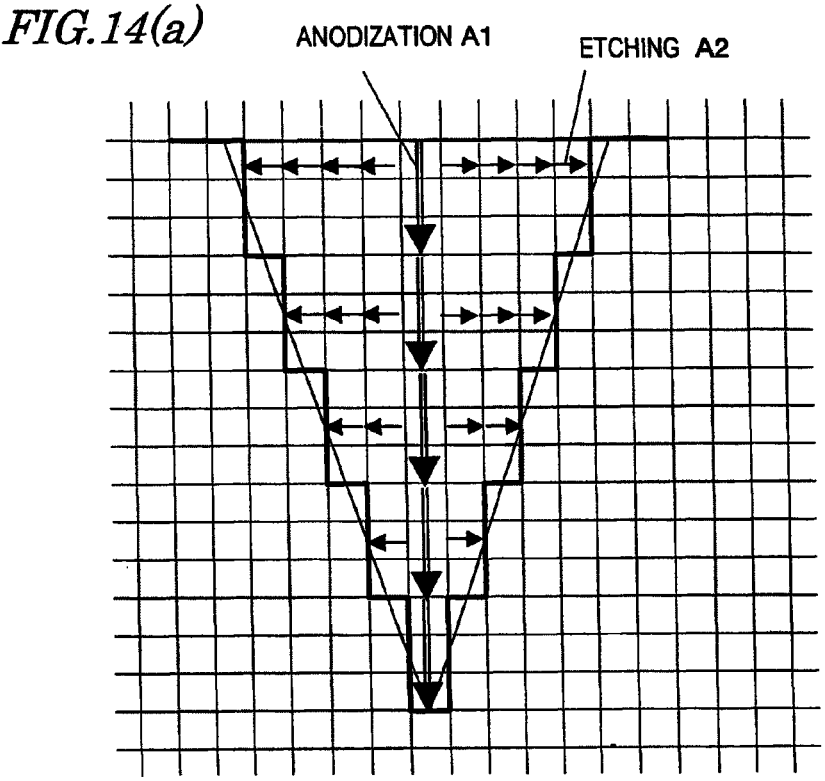
FIGS. 14(a) and 14(b) schematically illustrate the shape of a micropore 12a in a porous alumina layer 10a obtained by a method of making a stamper according to a preferred embodiment.
Figure 14B:
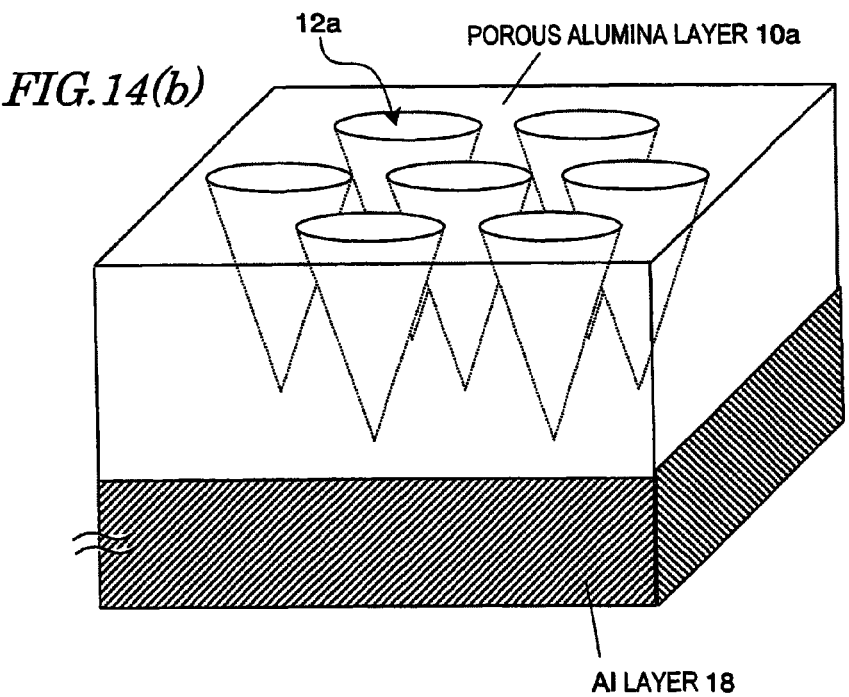

As shown in FIGS. 14(a) and 14(b), by repeatedly performing the process step of forming micropores in the depth direction by an anodization process as pointed by the arrow A1 (as shown in FIG. 13(d)) and the process step of increasing the pore size in the in-plane direction of the alumina layer by an etching process as pointed by the arrow A2 (as shown in FIG. 13(e)) under the same conditions every time, a micropore 12a with a stepped cross section, consisting of a number of steps with the same level difference (or height) corresponding to three squares and with the same width corresponding to one square, is formed. If the anodization and etching process steps are repeated at short intervals a great number of times, then a substantially conical micropore 12a can be formed as shown in FIG. 14(b). Also, by ending the process with the anodization process step as described above, a micropore 12a with the smallest possible bottom area (i.e., of which the deepest portion is substantially a point) can be formed.

According to the present embodiment, the important factors to improve the antireflectivity can be controlled easily. First of all, the period of the uneven surface structure (i.e., the gap between the micropores), according to which unnecessary diffracted light may or may not be produced, is controllable by the forming voltage to be applied during the anodization process. Alternatively, the unnecessary diffracted light may also be eliminated by making the micropores under such forming conditions as to disturb the periodicity thereof intentionally (i.e., not the conditions for forming a film with high periodicity). Furthermore, the depth (i.e., the aspect ratio) of the uneven surface structure is controllable by the depth of micropore made by the anodization process and the etch rate.

For example, if the depth of the micropore formed is greater than the etch rate (i.e., the opening size) as shown in FIG. 14, an uneven surface structure with a high aspect ratio is formed. The height (or the depth) of the uneven surface structure of an antireflective member is the most important factor to improve the antireflectivity. Also, in a micropore 12a with such a stepped side surface, if the sizes (i.e., the level difference and width) of the steps are shorter than the wavelength, diffraction (or reflection) of light is produced less easily than in an antireflective member with the same pitch even when the arrangement of the micropores 12a has periodicity.

Figure 24A:
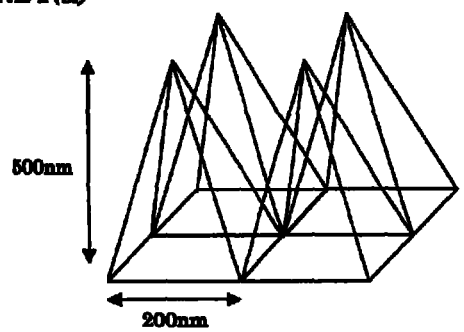
FIG. 24(a) is a schematic representation illustrating the arrangement of raised portions that were used to make a simulation.
Figure 24B:
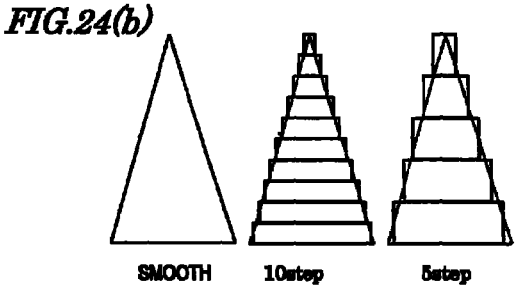
FIG. 24(b) illustrates various side surface shapes of the raised portions (i.e., a flat side surface with no steps, a side surface with ten steps and a side surface with five steps, respectively).
Figure 24C:
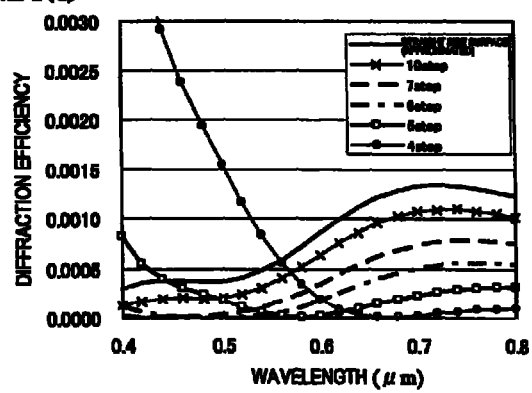
FIG. 24(c) is a graph showing the wavelength dependence of zero-order diffraction efficiency (i.e., reflection efficiency) that was evaluated by carrying out simulations.

Next, it will be described with reference to FIG. 24 how diffraction is minimized by an antireflective member including raised portions with a stepped side surface. FIG. 24(a) is a schematic representation illustrating the arrangement of raised portions that were used to make a simulation. FIG. 24(b) illustrates various side surface shapes of the raised portions (i.e., a flat side surface with no steps, a side surface with ten steps and a side surface with five steps, respectively). And FIG. 24(c) is a graph showing the wavelength dependence of zero-order diffraction efficiency (i.e., reflection efficiency) that was evaluated by carrying out simulations. The simulations were also carried out on raised portions, of which the side surfaces had four, six and seven steps, not just those raised portions with ten and five steps.

In this example, an antireflective member, including a periodic arrangement of quadrangular pyramidal raised portions having a height of 500 μm and a bottom of 200 μm square, was analyzed as shown in FIG. 24(a). As can be seen from FIG. 24(c), if the level difference of the stepped side surface is sufficiently smaller than the wavelength of visible radiation (i.e., 380 nm to 780 nm), the antireflective member is less likely to cause reflection (i.e., zero-order diffraction) of light than an antireflective member with the same pitch and same height. That is to say, the antireflection effects are good enough if the number of steps of the side surface is five or more (i.e., if the level difference is 100 nm or less). Particularly when the number of steps is five or six, significant antireflection effects are achieved in a broad wavelength range of visible radiation. Since the reflection efficiency also depends on the height of the uneven surface structure of the antireflective member, the best number of steps is appropriately adjusted. However, the antireflection efficiency can be increased by providing the stepped side surface. Furthermore, if the arrangement of raised portions has no periodicity, the wavelength dependence of the antireflection efficiency further decreases, thus achieving significant antireflection effects in a broad wavelength range.

The shape of the uneven surface structure itself can be controlled by adjusting the depth of the micropores and the etch rate in the anodization and etching process steps to be carried out repeatedly a number of times.

Figure 15A:
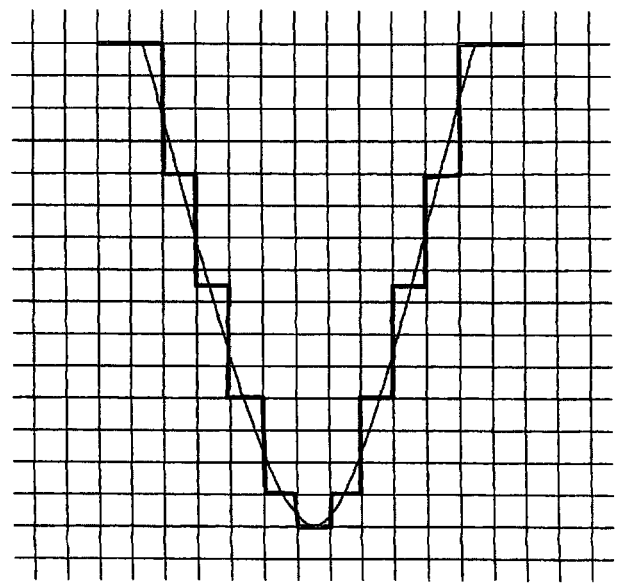
FIGS. 15(a) and 15(b) schematically illustrate the shape of a micropore 12b in a porous alumina layer 10b obtained by a method of making a stamper according to a preferred embodiment.
Figure 15B:
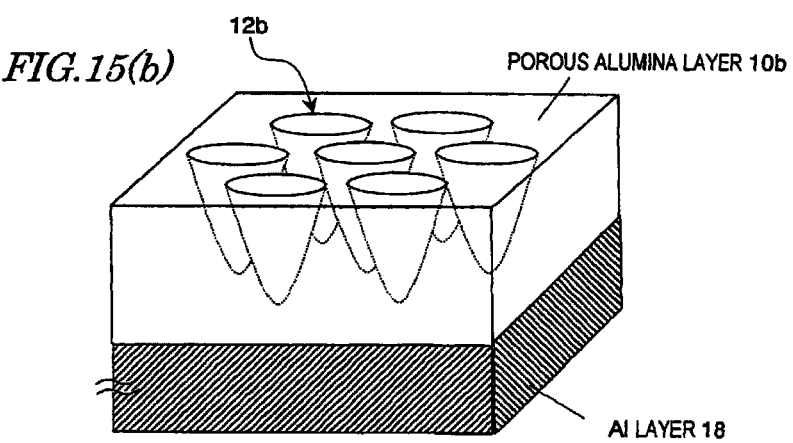

For example, the micropores 12b may be formed so as to have a stepped shape, of which the level differences decrease in the depth direction (i.e., toward the bottom), as in the porous alumina layer 10b shown in FIGS. 15(a) and 15(b). It should be noted that it is easy and preferable to control the depth of the micropores being formed by the forming process time. This is because to make a micropore at the same position again, i.e., from the bottom of an existent micropore as a start point, the anodization voltage and the type, concentration and temperature of the electrolytic solution, and other conditions are preferably constant in every anodization process step. Meanwhile, the etch rate is controllable by changing the types, temperatures and concentrations of the etchant or the etching process time. Furthermore, if an electrolytic solution with high dissolution ability such as sulfuric acid is used in the anodization process step, then an electrolytic solution to which no voltage is applied may be used as the etchant.

To realize high antireflectivity, the continuity of variation in effective refractive index is preferably increased at the interface between the incidence medium and the uneven surface structure and at the interface between the uneven surface structure and the base, and the areas of those contact portions are preferably minimized as described above. That is to say, in the uneven surface structure of a stamper to make an antireflective member by a transfer process, both the recessed portions and the raised portions thereof preferably have acute bottom and acute top (e.g., substantially point bottom and point top).

In a method of making a stamper according to this preferred embodiment, the micropores formed by the anodization become recessed portions. Thus, by performing no etching process step after the last anodization process step as shown in FIGS. 14 and 15, the bottom area of the micropores can be minimized.

Figure 16A:
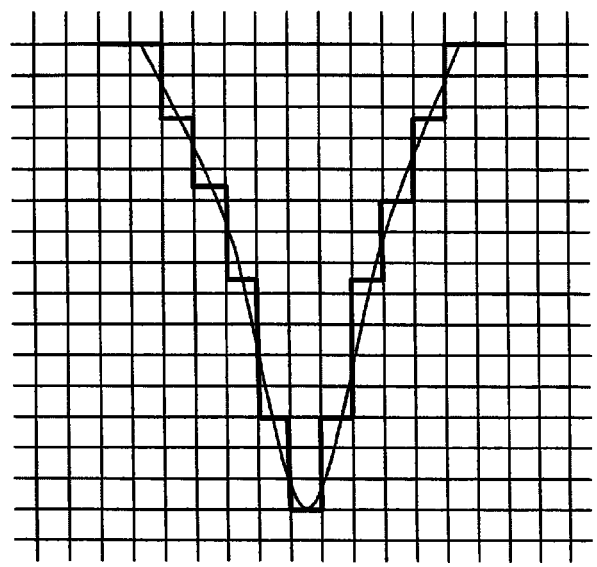
FIGS. 16(a) and 16(b) schematically illustrate the shape of a micropore 12c in a porous alumina layer 10c obtained by a method of making a stamper according to a preferred embodiment.
Figure 16B:
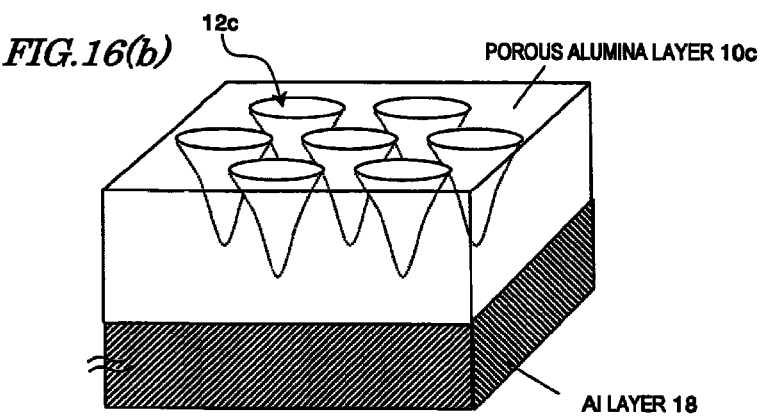

Alternatively, further pointed micropores 12c may be formed as in the porous alumina layer 10c shown in FIGS. 16(a) and 16(b). That is to say, according to this preferred embodiment, micropores 12c having such a stepped side surface that increases its level differences in the depth direction can be formed. In FIGS. 16(a) and 16(b), the level difference at the deepest portion of the micropores 12c is lower than the previous level difference. However, the present technology is in no way limited to this specific preferred embodiment. Naturally, an even higher level difference may be formed there instead.

Next, it will be described with reference to FIG. 17 how to sharpen the raised portions of the uneven surface structure of a stamper (i.e., the recessed portions of an antireflective member).

Figure 17A:
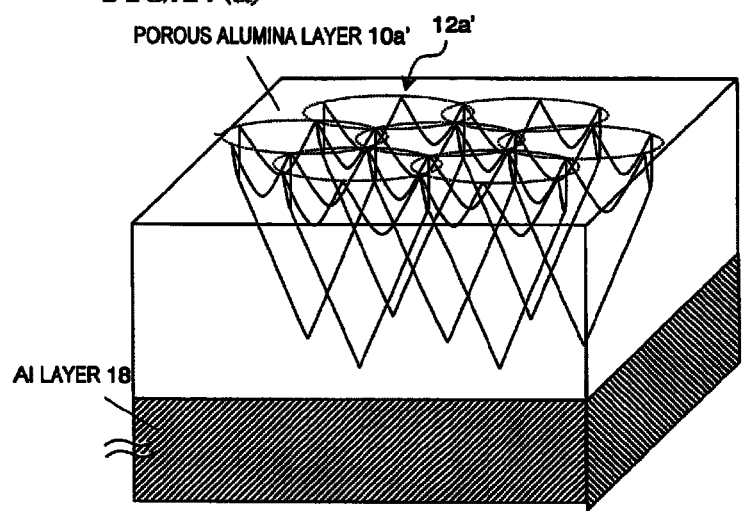
FIGS. 17(a) and 17(b) schematically illustrate the structure of a porous alumina layer 10a' obtained by making the micropores 12a shown in FIG. 14 and then repeatedly performing anodization and etching process steps under the same condition.
Figure 17B:
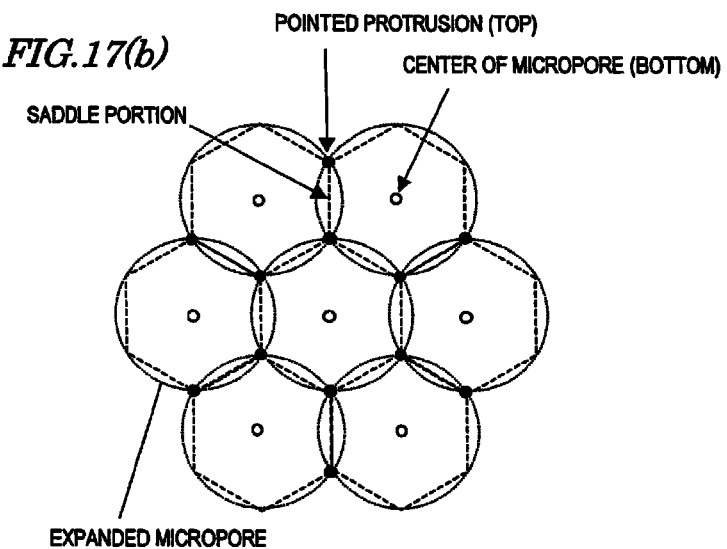

FIG. 17 illustrates a porous alumina layer 10a' formed by repeatedly performing anodization and etching process steps under the same conditions over and over again after the micropores 12a shown in FIG. 14 have been made. In this case, the last process step to be performed should be an anodization process step. By performing the anodization and etching process steps repeatedly a number of times in this manner, the substantially conical micropores 12a are expanded, and a portion that is most distant from the center of each micropore 12a' will be left in the end, thus forming a pointed protrusion (i.e., a top). In the example illustrated in FIG. 17, the micropores 12a' are arranged regularly. However, even if the micropores 12a' are not arranged regularly, such a pointed protrusion will be formed finally at a portion that is most distant from the center of each micropore 12a' by repeatedly performing the anodization and etching process steps. Thus, according to the method of this preferred embodiment, a stamper, of which the uneven surface structure has pointed recessed portions and pointed raised portions, can be obtained.

As shown in FIG. 17, the uneven surface structure formed by this method is characterized by having three to six pointed protrusions (i.e., tops) around one bottom point (i.e., the center of a micropore), and there is a depressed portion (or saddle portion) between these tops.

Figure 18A:
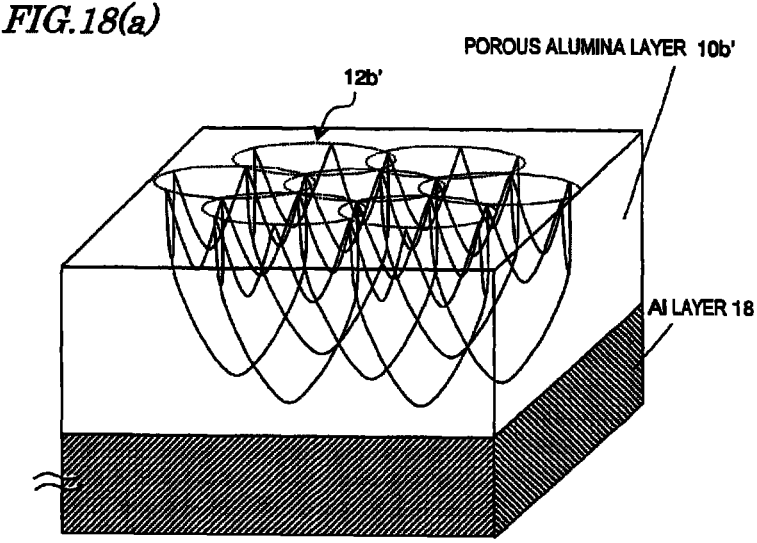
FIGS. 18(a) and 18(b) schematically illustrate the structures of porous alumina layers 10b' and 10c', respectively, obtained by forming the porous alumina layers 10b and 10c shown in FIGS. 15 and 16 and then repeatedly performing the anodization and etching process steps with the number of micropores and etch rate appropriately controlled until the raised portions become acute protrusions.
Figure 18B:
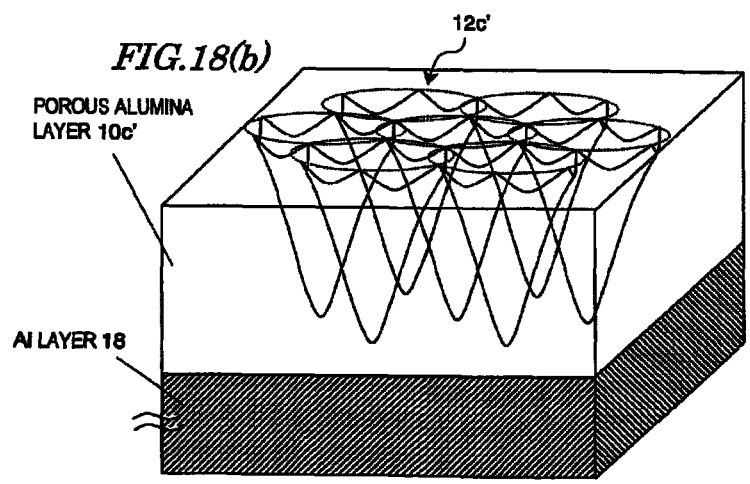

FIG. 18(a) illustrates a porous alumina layer 10b' obtained by repeatedly performing the anodization and etching process steps over and over again with the depth of micropores and the etch rate appropriately controlled after the porous alumina layer 10b shown in FIG. 15 has been formed and until each raised portion becomes a pointed protrusion. In this case, the last process step to perform should be an anodization process step. On the other hand, FIG. 18(b) illustrates a porous alumina layer 10c' obtained by repeatedly performing the anodization and etching process steps over and over again with the depth of micropores and the etch rate appropriately controlled after the porous alumina layer 10c shown in FIG. 16 has been formed and until each raised portion becomes a pointed protrusion. In this case, the last process step to perform should be an anodization process step, too.

By repeatedly forming micropores and etching the porous alumina layer with the conditions of the anodization and etching process steps adjusted and with the shape of the micropores controlled until the raised portions get pointed in this manner, the shape (e.g., the depth) of the saddle portions can also be controlled. As a result, the distribution of effective refractive indices on the transferred uneven surface can be controlled in various manners and a shape with pointed recessed portions and pointed raised portions can be formed.

Thus, according to the method of making a stamper of the preferred embodiment, the micropores of anodized porous alumina can be shaped relatively freely, and therefore, any desired uneven surface shape can be formed on the surface of a base. As a result, not just can be made a stamper having such a shape as to realize high antireflection function but also can be designed a stamper with the variation in its shape due to curing and shrinkage of a transferred resin taken into account.

It should be noted that when a display is subjected to some surface treatment, not just antireflection effects but also antiglare effects are often demanded. The "antiglare effects" are achieved by diffusing the reflected light with surface unevenness and reducing the quantity of light reaching the viewer's eyes directly. A surface unevenness that achieves such antiglare effects has a size that is sufficiently greater than the wavelength of light (i.e., at least greater than 780 nm) and that is much greater than the size of a fine uneven surface structure with antireflection effects. Consequently, the antiglare effects achieved by the macroscopic uneven surface structure and the antireflection effects achieved by the fine uneven surface structure can be combined with each other. That is to say, a process in which an uneven surface structure with a size of more than 780 nm to achieve antiglare effects is formed on the surface of aluminum of the base and then the fine uneven surface structure is formed on that base, is adopted. By transferring the surface shape of such a stamper obtained in this manner onto a resin, for example, an antireflective member that achieves not only the antiglare effects but also the antireflection effects (AGAR) can be obtained.

The stamper manufacturing process according to this preferred embodiment basically ends with a wet process. Thus, the uneven surface structure can be formed on the surface of a base of any of various shapes.

When the uneven surface structure is transferred onto a film, a roller-to-roller technique that ensures a high throughput is preferably adopted to cut down the cost as much as possible. Thus, a roller-shaped transfer stamper is often used. Such a roller-shaped stamper is ordinarily formed by making a shim (i.e., a thin stamper) out of a plate-shaped stamper and fixing the shim onto the surface of a roller. In that case, however, the plate-shaped stamper is fixed onto the roller, and therefore, the resultant uneven surface pattern will have a seam, thus making it impossible to transfer the surface pattern onto a large area continuously. That is why there is a high demand for a transferring stamper that has a pattern over the entire side surface of a roller.

Figure 19:
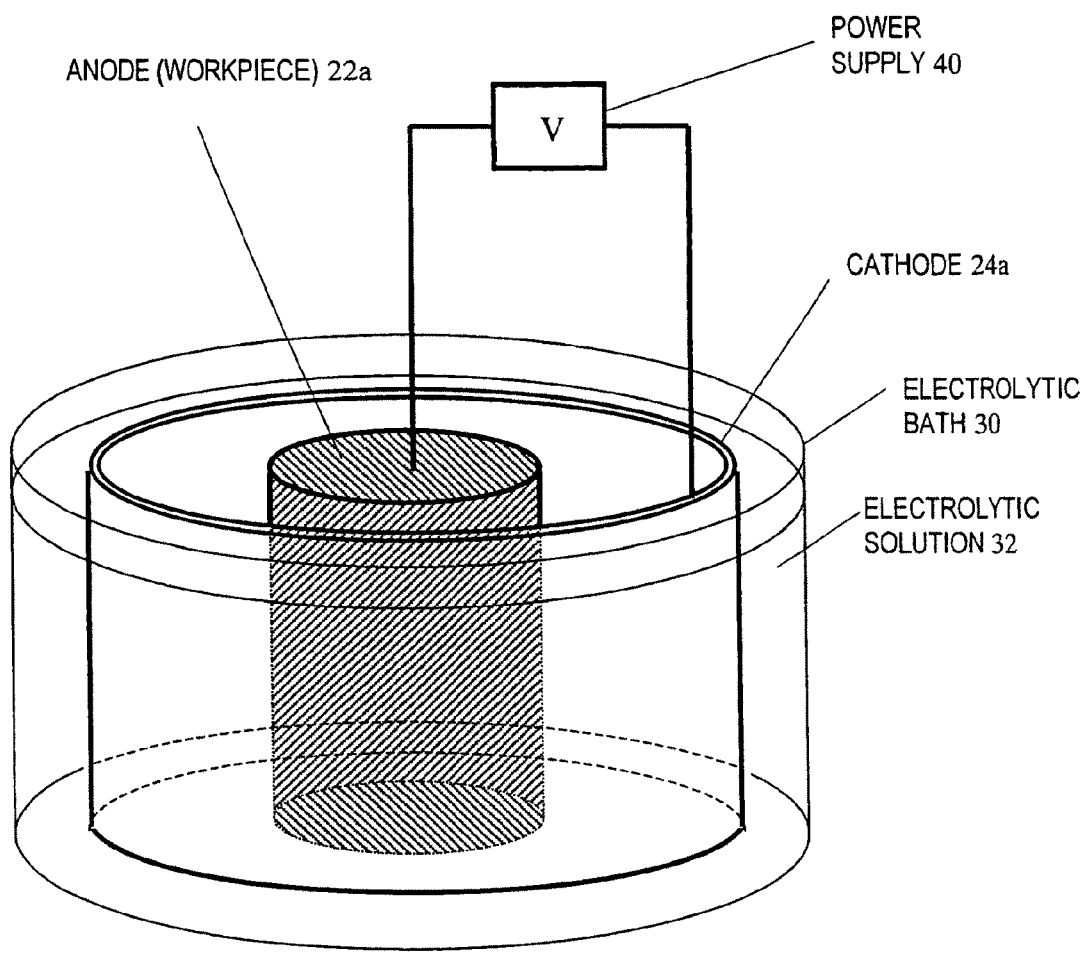
FIG. 19 is a schematic representation illustrating how to make an uneven surface structure on the entire outer surface of a roll-like base 22a by using a method of making a stamper according to a preferred embodiment.

FIG. 19 illustrates a method of forming an uneven surface structure over the entire outer surface of a roller-shaped base 22, for example, by utilizing the stamper manufacturing process described above.

First, a roller-shaped (i.e., columnar) base 22a, having aluminum on its outer surface, is immersed as an anode in an electrolytic solution 32 in an electrolytic bath 30, a cylindrical cathode 24a is arranged so as to surround the base 22a, and a voltage is applied thereto from a power supply 40. As long as aluminum is exposed on the outer surface of the base 22a, the base 22a may be either a bulk aluminum column or a non-aluminum roller-shape base coated with an aluminum layer. Also, the base 22a does not have to have a columnar shape but may have a cylindrical shape, too. Naturally, the cross-sectional shape of the base 22a does not have to be circular but may also be elliptical, for example.

By applying the stamper manufacturing process described above to this roller-shaped base 22a, a fine uneven surface structure with a controlled shape can be formed at a time over the entire surface of the roller. Consequently, no seam will be formed on the uneven surface pattern and a continuously transferable stamper can be obtained.

To increase the periodicity of the arrangement of micropores, the electrolytic solution 32 is preferably kept still through the anodization process step. If necessary, however, the electrolytic solution 32 may be stirred up depending on the shape of the base 22a.

Figure 20:
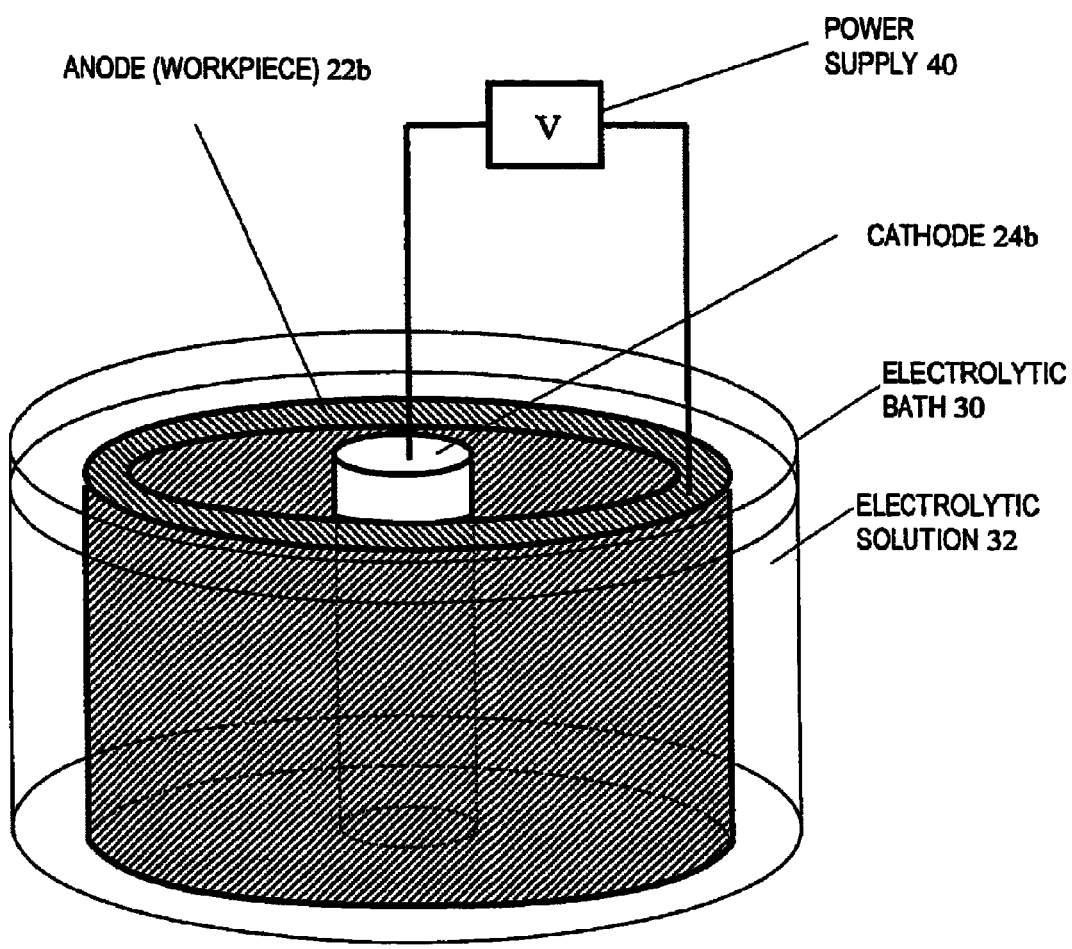
FIG. 20 is a schematic representation illustrating how to make an uneven surface structure on the entire inner surface of a cylindrical base 22b by using a method of making a stamper according to a preferred embodiment.

FIG. 20 illustrates a method for forming an uneven surface structure on the entire inner surface of a cylindrical base 22b, for example, by utilizing the stamper manufacturing process described above.

In this case, an anodization process step is carried out with either a cylinder made of bulk aluminum or a cylindrical base 22b, including an aluminum layer on the inner surface thereof, used as an anode and with a cathode 24b arranged inside the cylinder 22b, thereby forming an uneven surface structure on the inner surface of the base. Naturally, this inner surface may be used as a stamper as it is. Alternatively, an Ni electroformed stamper, on which the inner surface shape has been transferred, may be formed by a known process such as electroplating or electroless plating, and used as a stamper.

Using such a stamper, an antireflective member can be made by a known transfer process. For example, as a nano-imprint lithography for forming a nanometer-scale structure, a transfer process that utilizes UV curing or heat cycle may be used. In each of these transfer processes, a pattern (i.e., a fine uneven surface structure) is transferred from a stamper (or a mold or a die) with a nanometer-scale fine uneven surface structure onto a photocurable resin or a thermosetting resin by a press process.

An antireflective member may be formed by a UV curing transfer process that includes the process steps of:
  (a) coating a substrate (e.g., a PET film) with a photocurable resin (such as an urethane acrylate resin) uniformly using a spin coater (rotating at a velocity of 3,000 rpm, for example);
  (b) pressing the uneven surface of a stamper, which has been subjected to a mold release process, onto the photocurable resin film in a vacuum;
  (c) exposing the assembly to the air, thereby filling the uneven surface structure of the stamper with the photocurable resin;
  (d) irradiating the photocurable resin in the uneven surface structure of the stamper with an ultraviolet ray (with a wavelength of 365 nm at 10 mW for 360 seconds, for example), thereby curing the photocurable resin; and
  (e) removing the stamper from the substrate, thereby forming a photocured resin layer, on which the uneven surface structure of the stamper has been transferred, on the surface of the substrate.

EXAMPLES

A method of making a stamper according to a specific example of the embodiment will be described with reference to FIG. 13 again.

A 10 cm square aluminum plate 18 with a flattened surface was used as the base (see FIG. 13(a)).

An anodization process was carried out for five minutes using 0.05 mol/L of oxalic acid (at a temperature of 3° C., with a volume of 5 L and without being stirred) as an electrolytic solution and a 80 V direct current constant voltage source (with no variation with time), thereby forming an anodized porous alumina layer on the surface (see FIG. 13(b)).

The assembly was washed with ultrapure water and then immersed in 8 mol/L of phosphoric acid (at 30° C.) for 30 minutes, thereby removing the porous alumina layer (see FIG. 13(c)).

Subsequently, the base was washed again and then subjected to an anodization process step for 30 seconds (see FIG. 13(d)) and an etching process step for 19 minutes by immersing it in 1 mol/L of phosphoric acid (at 30° C.) (see FIG. 13(e)) alternately five times (under the same conditions every time).

Finally, the assembly was anodized for 30 seconds under the same conditions (see FIG. 13(d)).

FIGS. 21(a), 21(b) and 21(c) are micrographs showing a front view, a perspective view and a cross-sectional view of the uneven surface structure on the surface of the stamper that was formed by such a process.

The uneven surface structure had an arrangement of micropores, which showed no periodicity but were densely arranged at a gap of about 200 nm between two adjacent ones. The recessed portions had a depth of about 840 nm and an aspect ratio of about 4.2 and also had a substantially pointed deepest portion. Since the anodization process step and the etching process step had been repeated a sufficiently large number of times in this example, the raised portions also had an acute, substantially pointed top as already described with reference to FIG. 17. Also, the recessed portions were arranged so as to be substantially most densely packed.

Furthermore, the very small recessed portions (i.e., the micropores) had a stepped side surface that had been formed by repeatedly performing the anodization and etching process steps a number of times.

A UV curable resin film (made of a urethane acrylate resin produced by the INCTEC INC.) that has been applied on a PET film was pressed onto the uneven surface of the stamper thus obtained, and then irradiated with an ultraviolet ray (with a wavelength of 365 nm at 10 mW and for 360 seconds), thereby forming an antireflective member of a resin film on which the uneven surface structure had been transferred.

Figure 22A:
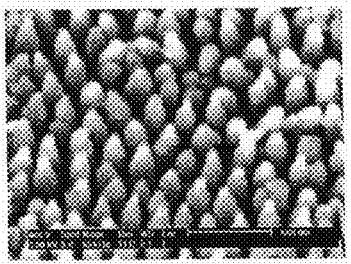
FIGS. 22(a) and 22(b) are SEM images showing the surface of an antireflective member according to a specific example of the present invention, which were observed with a scanning electron microscope at a magnification of approximately 63,500 and at a magnification of approximately 36,800, respectively.
Figure 22B:
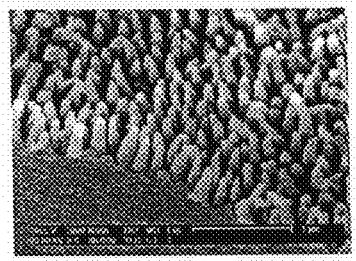
Figure 23:
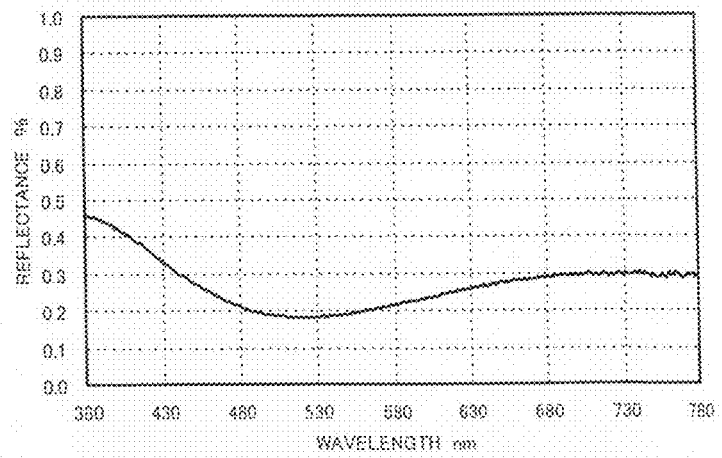
FIG. 23 is a graph showing the spectral reflectance characteristic of the light that has been regularly reflected from an antireflective member according to a specific example of the example embodiment.

The surface of the antireflective member thus obtained was observed with a scanning electron microscope. The results are shown in FIG. 22. Specifically, FIGS. 22(a) and 22(b) are SEM images that were shot at a magnification of approximately 63,500 and at a magnification of approximately 36,800, respectively. As can be seen from FIG. 22, the raised portions on which the recessed portions of the stamper had been transferred also had a stepped side surface. FIG. 23 shows the spectral reflectance characteristic of the light that has been regularly reflected from this antireflective member. The regular reflectance in the visible radiation range of 380 nm to 780 nm was about 0.5% or less and no diffracted light was produced.

As described above, according to a specific example of the present embodiment, an antireflective member with excellent antireflectivity can be provided.

According to the present embodiment, an antireflective member that can minimize the production of minus-first-order diffracted light and the zero-order reflected diffracted light can be obtained. The antireflective member of the present embodiment can be used effectively and broadly in various optical elements including optical waveguides, polarizers, protectors and antireflective plates and in numerous types of display devices including the optical element such as liquid crystal display devices, electroluminescent display devices, and electrophoretic display devices.

The present embodiment also provides a method of making a stamper that can be used effectively to make an antireflective member with a motheye structure, a method of making an antireflective member using such a stamper, and an antireflective member.

While the present technology has been described with respect to preferred embodiments thereof, it will be apparent to those skilled in the art that the disclosed technology may be modified in numerous ways and may assume many embodiments other than those specifically described above. Accordingly, it is intended by the appended claims to cover all modifications of the technology that fall within the true spirit and scope of the technology.

What is claimed is:

1. A method of making a stamper that has a fine uneven surface structure, the method comprising the steps of:
    (a) providing a base, of which a surface has an aluminum layer including at least 95 mass % of aluminum;
    (b) anodizing the aluminum layer partially, thereby forming a porous alumina layer with a plurality of recessed portions; and
    (c) bringing the porous alumina layer into contact with an alumina etchant to expand the recessed portions of the porous alumina layer, wherein
    a plurality of recessed portions, each having a stepped side surface, are formed on the porous alumina layer by alternately and repeatedly performing the steps (b) and (c) a number of times, wherein
    one or more of the recessed portions are surrounded with three to six pointed raised portions, and wherein
    a plurality of saddle portions, which are different from the plurality of raised portions and the plurality of recessed portions, are between the tops of adjacent raised portions, each saddle portion interconnecting the tops of two adjacent raised portions, wherein
    the each saddle portion having, at the midpoint of the tops of two adjacent raised portions, a smaller height than the raised portions.

2. The method of claim 1, wherein the repetition of the steps (b) and (c) ends with the step (b).

3. The method of claim 1, wherein the deepest part of the recessed portions substantially defines a point.

4. The method of claim 1, wherein the base further includes an electrically conductive metal layer or semiconductor layer as an undercoat layer for the aluminum layer.

5. The method of claim 1, wherein the metal layer is made of a valve metal.

6. The method of claim 1, further comprising the step of forming a metal layer containing Ni or W over the porous alumina layer after the recessed portions with the stepped side surface have been formed on the porous alumina layer.

7. The method of claim 1, further comprising the step of subjecting the porous alumina layer to a surface treatment after the recessed portions with the stepped side surface have been formed on the porous alumina layer.

8. The method of claim 1, wherein
    the base has either a columnar shape or a cylindrical shape, and the surface thereof defines the outer surface of the base, on which the recessed portions are arranged seamlessly.

9. The method of claim 1, wherein
    the base has a cylindrical shape, and the surface thereof defines the inner surface of the base, on which the recessed portions are arranged seamlessly.

10. The method of claim 1, wherein
    the aluminum layer arranged on the base has an uneven structure formed thereon which has a size that is greater than 780 nm.

11. The method of claim 1, wherein
    the recessed portions of the fine uneven surface structure have a gap of 100 nm to 200 nm between adjacent ones thereof.

12. The method of claim 1, wherein
    the recessed portions of the fine uneven surface structure are arranged so as to have no periodicity.

13. The method of claim 1, further comprising the step of making a metallic stamper by using either the porous alumina layer, on which the recessed portions with the stepped side surface have been formed, or a member on which the surface structure of the porous alumina layer has been transferred.

14. A method of making an antireflective member using a stamper, the method comprising the steps of:
    making a stamper that has a fine uneven surface structure by the method of including the steps of:
    (a1) providing a base, of which a surface has an aluminum layer including at least 95 mass % of aluminum;
    (b1) anodizing the aluminum layer partially, thereby forming a porous alumina layer with a plurality of recessed portions; and
    (c1) bringing the porous alumina layer into contact with an alumina etchant to expand the recessed portions of the porous alumina layer, wherein
    a plurality of recessed portions, each having a stepped side surface, are formed on the porous alumina layer by alternately and repeatedly performing the steps (b1) and (c1) a number of times; and
    transferring the fine uneven surface structure of the stamper, wherein
    one or more of the recessed portions are surrounded with three to six pointed raised portions, and wherein
    a plurality of saddle portions, which are different from the plurality of raised portions and the plurality of recessed portions, are between the tops of adjacent raised portions, each saddle portion interconnecting the tops of two adjacent raised portions, wherein
    the each saddle portion having, at the midpoint of the tops of two adjacent raised portions, a smaller height than the raised portions.

* * * * *